(12) United States Patent
Won

(10) Patent No.: US 11,913,652 B2
(45) Date of Patent: Feb. 27, 2024

(54) WINDOW-MOUNTED SMART AIR PURIFIER

(71) Applicant: Tae yeon Won, Incheon (KR)

(72) Inventor: Tae yeon Won, Incheon (KR)

( * ) Notice: Subject to any disclaimer, the term of this patent is extended or adjusted under 35 U.S.C. 154(b) by 334 days.

(21) Appl. No.: 17/222,167

(22) Filed: Apr. 5, 2021

(65) Prior Publication Data

US 2021/0310671 A1 Oct. 7, 2021

(30) Foreign Application Priority Data

Apr. 6, 2020 (KR) .................... 10-2020-0041474

(51) Int. Cl.
*F24F 1/03* (2019.01)
*F24F 1/031* (2019.01)
(Continued)

(52) U.S. Cl.
CPC .............. *F24F 1/031* (2019.02); *F24F 8/108* (2021.01); *F24F 11/523* (2018.01); *F24F 2221/20* (2013.01)

(58) Field of Classification Search
CPC .......... F24F 1/031; F24F 8/108; F24F 11/523; F24F 2221/20; F24F 12/006; F24F 11/58;
(Continued)

(56) References Cited

U.S. PATENT DOCUMENTS

| 1,153,067 A | * | 9/1915 | Hackney | ................. | F24F 7/013 |
| | | | | | 55/DIG. 35 |
| 2,010,808 A | * | 9/1915 | Braine | .................... | F24F 13/15 |
| | | | | | 454/224 |

(Continued)

FOREIGN PATENT DOCUMENTS

| CN | 107401800 | * | 11/2017 | | |
| CN | 107401800 A | * | 11/2017 | ............ | F24F 12/006 |

(Continued)

OTHER PUBLICATIONS

Epo translation of KR100728339 (Year: 2007).*
Epo translation of CN107401800 (Year: 2017).*
Epo translation of KR20190113516 (Year: 2019).*

*Primary Examiner* — Stephen Hobson
(74) *Attorney, Agent, or Firm* — KORUS Patent, LLC; Seong Il Jeong

(57) ABSTRACT

The invention provides a window-mounted smart air purifier comprising a housing unit divided into an indoor air exhaust space, an outdoor air introduction space, an outdoor air discharge space, a central space, and an indoor air introduction space that air moves therebetween; circulation units in the indoor air exhaust space/the outdoor air discharge space, comprising fans that forcibly circulates air and that polluted indoor/outdoor air moves toward outside/inside; an air purification unit comprising filters between the indoor air introduction space and the central space, between the outdoor air introduction space and the central space, and a hepa and deodorization filter and filtering impurities contained in indoor/outdoor air; a heat exchanger exchanging heats between outdoor and indoor air in respective pipes; a controller controlling the first and the second air circulation unit, and a fixing unit fixing the housing unit to a window frame.

3 Claims, 20 Drawing Sheets

(51) Int. Cl.
*F24F 8/108* (2021.01)
*F24F 11/523* (2018.01)

(58) Field of Classification Search
CPC .............. F24F 2110/12; F24F 2110/22; F24F 2110/64; F24F 2110/66; F24F 2110/70; F24F 11/56; F24F 11/61; F24F 11/77; F24F 13/10; F24F 13/28; F24F 7/007; F24F 13/20; F24F 7/06; F24F 8/10; F24F 12/001; Y02B 30/56; Y02B 30/70; F16F 15/067; H04M 1/72403
See application file for complete search history.

(56) References Cited

U.S. PATENT DOCUMENTS

| | | | | |
|---|---|---|---|---|
| 2,036,851 | A * | 4/1936 | Chittenden | F24F 7/013 454/214 |
| 2,218,330 | A * | 10/1940 | Ellason | F24F 1/0035 192/116.5 |
| 2,337,325 | A * | 12/1943 | Hach | F24F 7/00 417/350 |
| 2,373,497 | A * | 4/1945 | Paiste, Jr. | F24F 7/013 454/200 |
| 2,559,495 | A * | 7/1951 | Calkins | F24F 7/013 454/224 |
| 3,120,340 | A * | 2/1964 | Strumpell | F24F 13/20 454/200 |
| 3,158,083 | A * | 11/1964 | Seihost | F24F 13/10 454/267 |
| 3,570,386 | A * | 3/1971 | Baumann | F04D 25/166 454/212 |
| 4,043,141 | A * | 8/1977 | Levy | F24F 3/14 261/106 |
| 4,458,745 | A * | 7/1984 | Gartner | F24D 5/10 165/56 |
| 4,460,388 | A * | 7/1984 | Fukami | F24F 13/30 165/166 |
| 5,238,052 | A * | 8/1993 | Chagnot | F24F 3/1423 96/144 |
| 5,660,586 | A * | 8/1997 | Chiu | F04D 25/10 454/285 |
| 5,660,605 | A * | 8/1997 | Chan | F24F 1/0071 96/26 |
| 5,730,651 | A * | 3/1998 | Chen | F24F 7/013 454/205 |
| 5,902,183 | A * | 5/1999 | D'Souza | F24F 11/30 454/258 |
| 6,328,095 | B1* | 12/2001 | Felber | F24F 3/1423 165/8 |
| 7,083,110 | B2* | 8/2006 | Kim | E06B 7/10 454/200 |
| 7,238,105 | B2* | 7/2007 | Reinders | F28D 5/00 454/223 |
| 2004/0162016 | A1* | 8/2004 | Urbank | B60H 1/008 454/75 |
| 2006/0137521 | A1* | 6/2006 | Sung | B01D 46/0038 95/1 |
| 2006/0179800 | A1* | 8/2006 | Williams | F16K 15/038 55/312 |
| 2007/0264927 | A1* | 11/2007 | Choi | F24F 11/0001 454/196 |
| 2008/0242212 | A1* | 10/2008 | El-Galley | F24F 13/06 454/258 |
| 2009/0101727 | A1* | 4/2009 | Boudreau | F24F 3/14 236/44 C |
| 2010/0078492 | A1* | 4/2010 | Cislo | F24F 11/0001 236/49.3 |
| 2011/0040412 | A1* | 2/2011 | Wiese | F24F 13/18 700/275 |
| 2015/0300670 | A1* | 10/2015 | Sakamoto | F24F 11/0001 165/244 |
| 2019/0383505 | A1* | 12/2019 | Kim | F24F 11/56 |
| 2020/0155992 | A1* | 5/2020 | Park | B01D 46/10 |

FOREIGN PATENT DOCUMENTS

| | | | | |
|---|---|---|---|---|
| CN | 108361874 A | * | 8/2018 | ............ F24F 12/006 |
| CN | 108534333 A | * | 9/2018 | ............ F24F 12/006 |
| CN | 108917081 A | * | 11/2018 | |
| KR | 10-0728339 B1 | | 6/2007 | |
| KR | 100728339 | * | 6/2007 | |
| KR | 101855482 B1 | * | 1/2019 | |
| KR | 1956632 B1 | * | 3/2019 | ......... B01D 46/0065 |
| KR | 20190003870 A | * | 3/2019 | |
| KR | 10-1965770 B1 | | 4/2019 | |
| KR | 20190113516 | * | 10/2019 | |
| KR | 10-2019-0142091 A | | 12/2019 | |
| KR | 10-2060633 B1 | | 12/2019 | |
| WO | WO-2005092473 A1 | * | 10/2005 | ............ B01D 39/16 |

* cited by examiner

WINDOW-MOUNTED SMART AIR PURIFIER

FIELD OF THE INVENTION

The present invention relates to an air purifier, and more particularly, to a window-mounted smart air purifier that can ventilate indoor through air circulation between indoor and outdoor air; supply purified air into indoor through an additional air purification unit; adjust the temperature of the purified air to room temperature when supplying fresh and purified air into indoor from outdoor, by improving the structure of a smart air purifier, which can maintain comfortable indoor environment and enable to save heating expense.

BACKGROUND OF THE INVENTION

In order to maintain comfortable indoor environment, ventilation is essential by sending indoor air to outside and bring in fresh air from outside.

In case a lot of people stay in a small space, such as an apartment, an office, and a vehicle, polluted indoor air should be replaced with fresh air frequently.

Ventilation can be categorized into a natural circulation type, in which indoor air is replaced with fresh air by natural wind through an opened window, and a forced circulation type, which uses a ventilator.

These days, air purification is performed by a ventilation device, which exchanges indoor air for outdoor air, and an air cleaning device, which purifies indoor polluted air into fresh air. These two functional devices are separately installed.

As the ventilation device is installed at the ceiling, and the air cleaning device is put at an indoor space, each of them is separately turned on, as necessary.

The conventional method for improving indoor air quality has low efficiency because the ventilation device and the air cleaning device should be installed and used separately.

Thus, when ventilating indoor using the ventilation device, polluted outdoor air is not filtered, and pollutants are introduced into indoor due to poor performances on dust collection and deodorization of the ventilation device. Furthermore, when using the air cleaning device, dust collection and deodorization abilities of the air cleaning device are not enough to improve the quality of the indoor air.

Therefore, new devices in which a ventilation device and an air cleaning device can be installed at the same time, are being developed.

Meanwhile, Korean Publication No. 10-2003-0029955 discloses "A wall-mounted air cleaner with ventilation function."

However, when this air cleaner with ventilation function is turned on during the winter, air from outdoor has low temperature and reduces room temperature, which lowers the heating efficiency.

Technical Problem

The present invention is devised to solve the problems mentioned above. One object of the invention is to provide a window-mounted smart air purifier that can supply purified air into indoor through an additional air purification unit as well as ventilate indoor through air circulation between indoor and outdoor air by improving the structure of a ventilator and an air cleaner, which can maintain comfortable indoor environment.

Another object of the invention is to provide a window-mounted smart air purifier that can supply the purified air that is adjusted to have room temperature when supplying fresh and purified air into indoor from outside, which can enable to save heating expense.

Another object of the invention is to provide a window-mounted smart air purifier that can transfer the heat of the polluted indoor air that is discharged from indoor to the fresh and purified air that is supplied into indoor using a heat exchanger, which can improve energy efficiency.

Another object of the invention is to provide a window-mounted smart air purifier that can enable to be installed without perforation in the ceiling during the installation process, which can enhance convenience of installation.

SUMMARY OF THE INVENTION

According to one embodiment of the present invention, the present invention provides a window-mounted smart air purifier comprising: a housing unit that is divided into an indoor air exhaust space 311, an outdoor air introduction space 314, an outdoor air discharge space 316, a central space 318, and an indoor air introduction space 319 in such a way that air moves around between the spaces, wherein the indoor air exhaust space 311 includes an indoor air exhaust opening 313, the indoor air introduction space 319 includes an indoor air suction opening 312, the outdoor air introduction space 314 includes an outdoor air suction opening 315, and the outdoor air discharge space 316 includes a fresh air discharge opening 317; a first air circulation unit 320 that is installed in the indoor air exhaust space 311 and comprises a first air circulation fan 321 that forcibly circulates air so that polluted indoor air introduced through the indoor air suction opening 312 moves toward the indoor air exhaust opening 313; a second air circulation unit 330 that is installed in the outdoor air discharge space 316 and comprises a second air circulation fan 331 that forcibly circulates air so that outdoor air introduced through the outdoor air suction opening 315 moves toward the outdoor air discharge space 316; an air purification unit 340 that purifies air by filtering impurities contained in the indoor air introduced through the indoor air suction opening 312 and in the outdoor air introduced through the outdoor air suction opening 315, and that comprises a first free filter P1 installed between the indoor air introduction space 319 and the central space 318, a second free filter P2 installed between the outdoor air introduction space 314 and the central space 318, and a hepa filter and deodorization filter P3; a heat exchanger 350 that is installed at the central space 317 where each of the indoor air and the outdoor air passes through an individual pipe, intersecting with each other, and that is disposed in such a way that the pipes of the indoor air and the outdoor air exchanges heats each other; a controller 360 that controls operations of the first air circulation unit 320 and the second air circulation unit 330, and a fixing unit 370 that fixes the housing unit 310 to a window frame 30.

The controller 360 further comprises a timer T to check a replacement period of the hepa filter and deodorization filter P3, and a reset function to reset the timer T when replacing the filter.

In addition, the controller 360 further comprises a sensor module that measures qualities of outdoor air and indoor air, wherein the sensor module comprises a VOC sensor N1, a $CO_2$ sensor N2, and a coarse particle sensor N3.

Furthermore, the window-mounted smart air purifier according to claim 1, the window-mounted smart air purifier further comprises a spring damper 380 that is installed in the outdoor air suction opening 315, wherein the spring damper 380 opens the outdoor air suction opening 315 when air circulates, and closes down the outdoor air suction opening 315 when air stop circulating, wherein when the controller 360 determines that there are problems in the outdoor air that are detected by the VOC sensor N1, and stops an operation of the second air circulation unit 330, the spring damper 380 closes down the outdoor air suction opening 315 by its own elastic force, and when the controller 360 determines that there is no issue in the outdoor air that is detected by the VOC sensor P1, and allows an operation of the second air circulation unit 330, a force generated by the air circulation forcibly opens the outdoor air suction opening 315.

The controller 360 further comprises a IoT function that exchanges data through a smart device and internet, and that enables a user to check information including an outdoor temperature, an outdoor humidity, an overall outdoor air quality, an outdoor air quality, an overall indoor air quality, an indoor air quality, remote control, and filter replacement time, through the smart device.

Moreover, the fixing unit 370 comprises: a frame body 371 that has a square shape with an opening upward, and that includes: a first connection groove 373 formed on an outer side of the frame body 371 to connect the frame body 371 to a rail of the window frame 30; a roller 374 formed on a bottom side of the first connection groove 373; a slide groove 375 formed on an inner side of the frame body 371 to conjointly engage with edges of the housing unit 310; an inserting hole 377 formed on a top end of the frame body 371, and a mohair 373a formed in the first connection groove 373; a slide wall 470 that is fixed to a top end of the housing unit 310, and covers from the top end of the housing unit 310 to a top portion of the window frame 30.

The sliding wall 470 comprises: a lower plate 471 that is engaged with the top end of the housing unit 310, and that includes: a guide groove 472 formed in an inner side of the lower plate 471; an insertion bump 473 protruded from and formed in a bottom end of the lower plate 471 to be inserted and connected to the inserting hole 377 of the frame body 371; a second connection groove 474 formed in both lateral sides of the lower plate 471, to connect lower plate 471 to the rail of the window frame 30, and a fixing hole H formed in a top portion of lower plate 471; an upper plate 475 that is sliding-movably connected to the lower plate 471, and that includes: a guide bump 476 formed in an outer side of the upper plate 475 and sliding-movably connected to the guide groove 472; a contact member 477 formed in both lateral sides of the upper plate 475 along the lower plate 471 and meeting with edges of the lower plate 471 for stable sliding motion; and a third connection groove 478 formed in both lateral sides of a top end of the upper plate 475 and connected to the rail of the window frame; a stopper 570 that is disposed between the lower plate 471 and the upper 475 plate and that limits a sliding motion of the upper plate 475 when an adjustable length of the lower plate 471 and the upper plate 475 by the sliding motion of the upper plate 475, reaches to a desired length, and a binder 670 that is engaged with the fixing hole H, wherein an end of the binder 670 pressurizes the guide bump 476, whereby enabling the lower plate 471 and the upper plate 475 to be fixed.

The stopper 570 comprises: a wedge type stopper 571 that is formed at a back side of the lower plate 471 and that is protruded toward the upper plate 475 by an elastic force of an elastic spring 572, and a stopper rail 574 that is formed at a front side of the upper plate 475 to be stuck in and connected to the wedge type stopper 571, and that has a shape where wedge type grooves and bumps are alternatively formed.

Technical Effects of the Invention

According to a window-mounted smart air purifier of the present invention, it can maintain comfortable indoor environment by improving the indoor air quality. The window-mounted smart air purifier also enables to save heating expense by supplying the purified air that is adjusted to have room temperature.

In addition, the window-mounted smart air purifier can provide more comfortable indoor environment through automatic control of the speed of air circulation fan according to concentrations of indoor CO2 and coarse particles.

Furthermore, the window-mounted smart air purifier can improve energy efficiency using a heat exchanger by transferring the heat of the polluted indoor air that is discharged from indoor to the fresh and purified air that is supplied into indoor.

Moreover, the window-mounted smart air purifier can enhance convenience of its installation by enabling it to be installed without perforation in the ceiling or the walls during the installation process.

DETAILED DESCRIPTION EMBODIMENTS OF THE INVENTIONS

Figure 1:
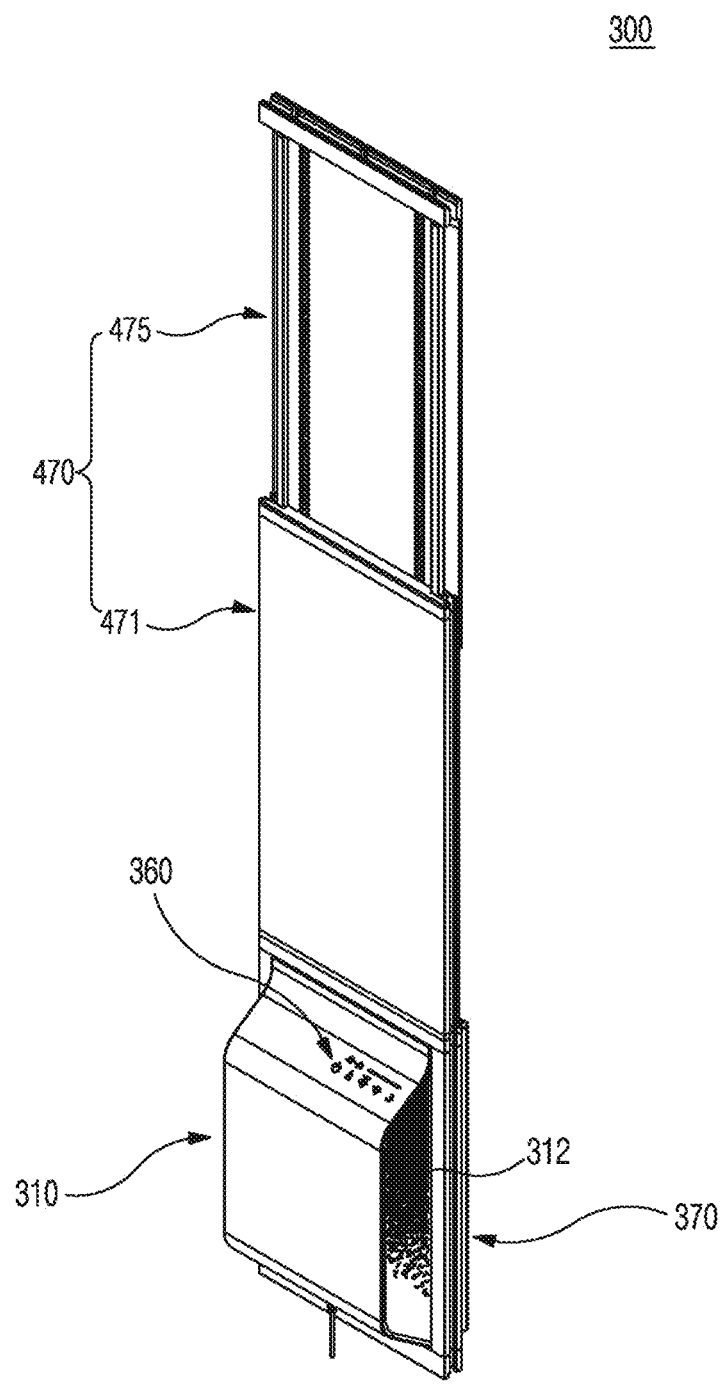
FIG. 1 is a front perspective view of a window-mounted smart air purifier according to a preferable embodiment of the present invention.

All of the terms used specification and claims should not be interpreted to limit as meanings in a generally used dictionary and should be interpreted as having the same meanings as the contextual meanings of the relevant technology.

Thus, embodiments described in the specification and structures illustrated in the drawings of the present invention are preferable embodiments of the present invention and do not define the inventive concepts of the present invention. Therefore, it would be apparent that many more equivalents, modifications, and variations than mentioned above are possible.

Hereafter, a window-mounted smart air purifier according to preferable embodiment of the present invention will be described in detail with reference to the accompanying drawings.

Figure 2:
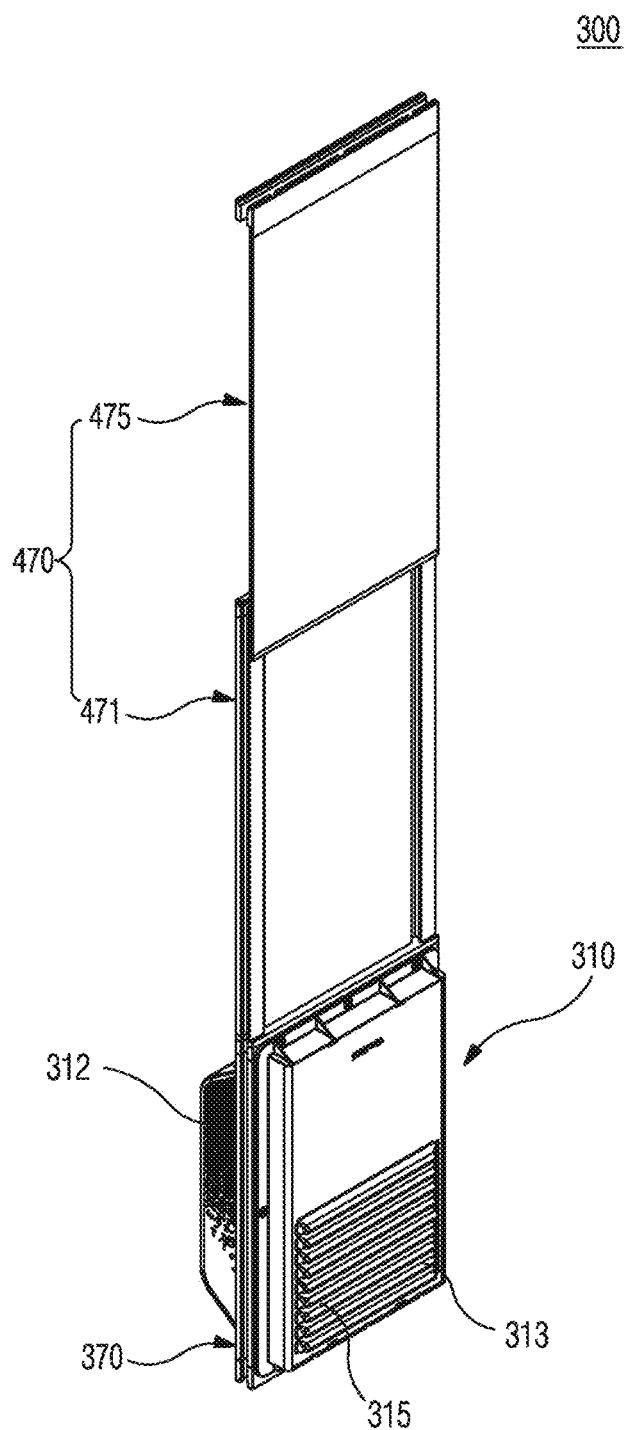
FIG. 2 is a back perspective view of a window-mounted smart air purifier according to a preferable embodiment of the present invention.
Figure 3:
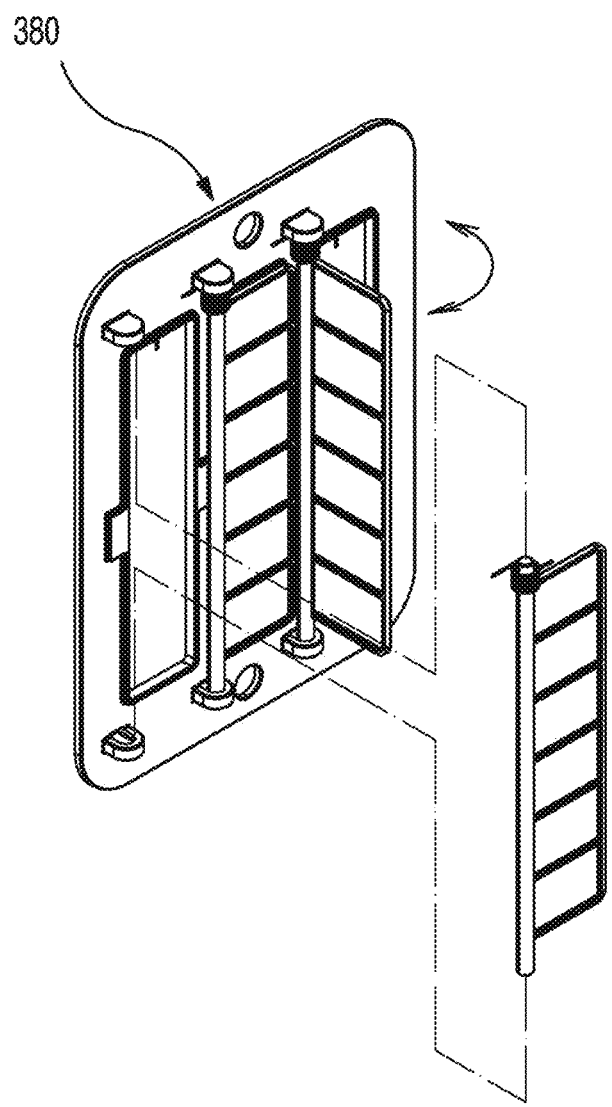
FIG. 3 is an exploded perspective view of an operational motion of a spring damper of a window-mounted smart air purifier according to a preferable embodiment of the present invention.
Figure 4:
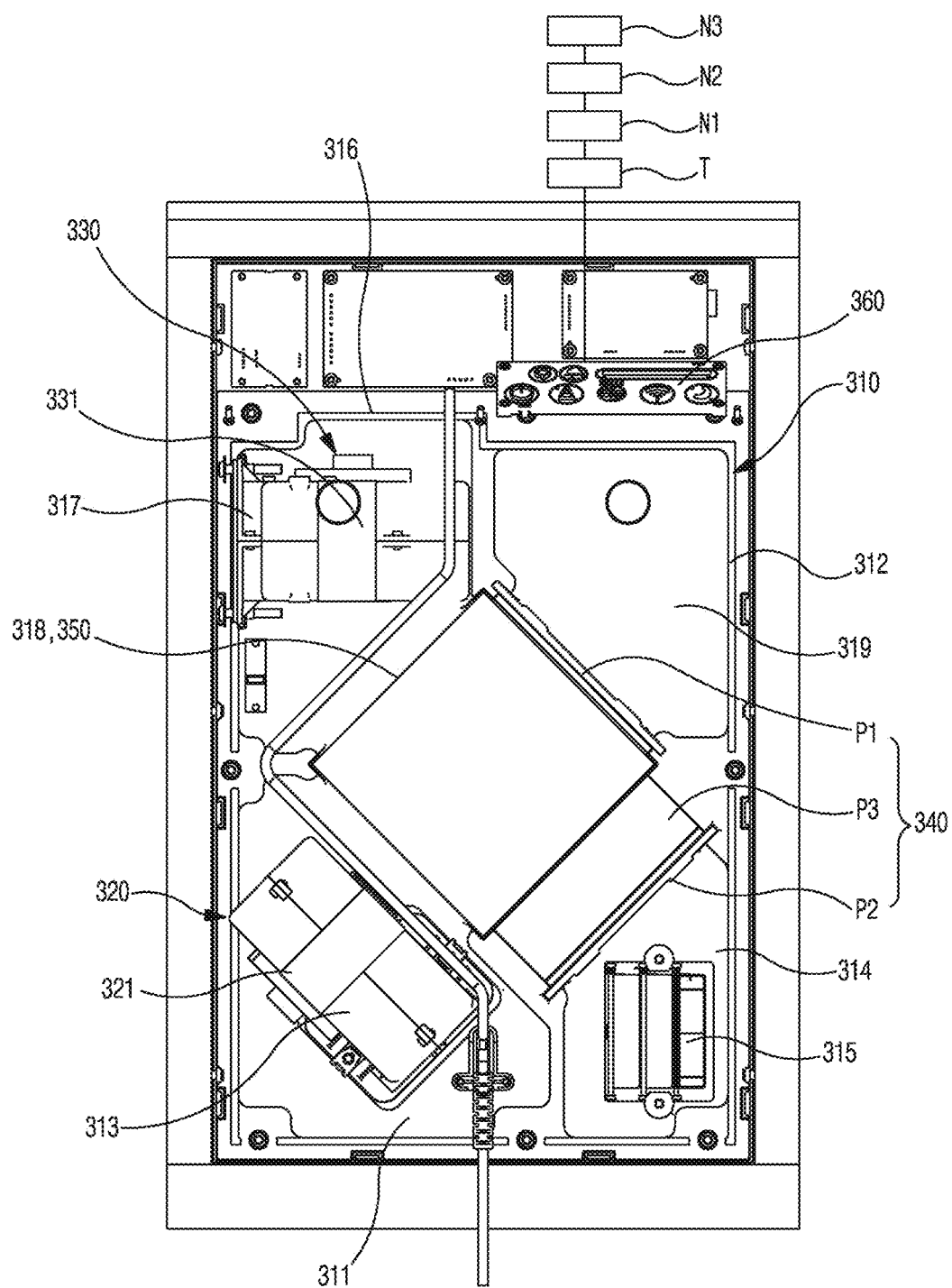
FIG. 4 is a drawing showing an inner structure of a window-mounted smart air purifier according to a preferable embodiment of the present invention.
Figure 5:
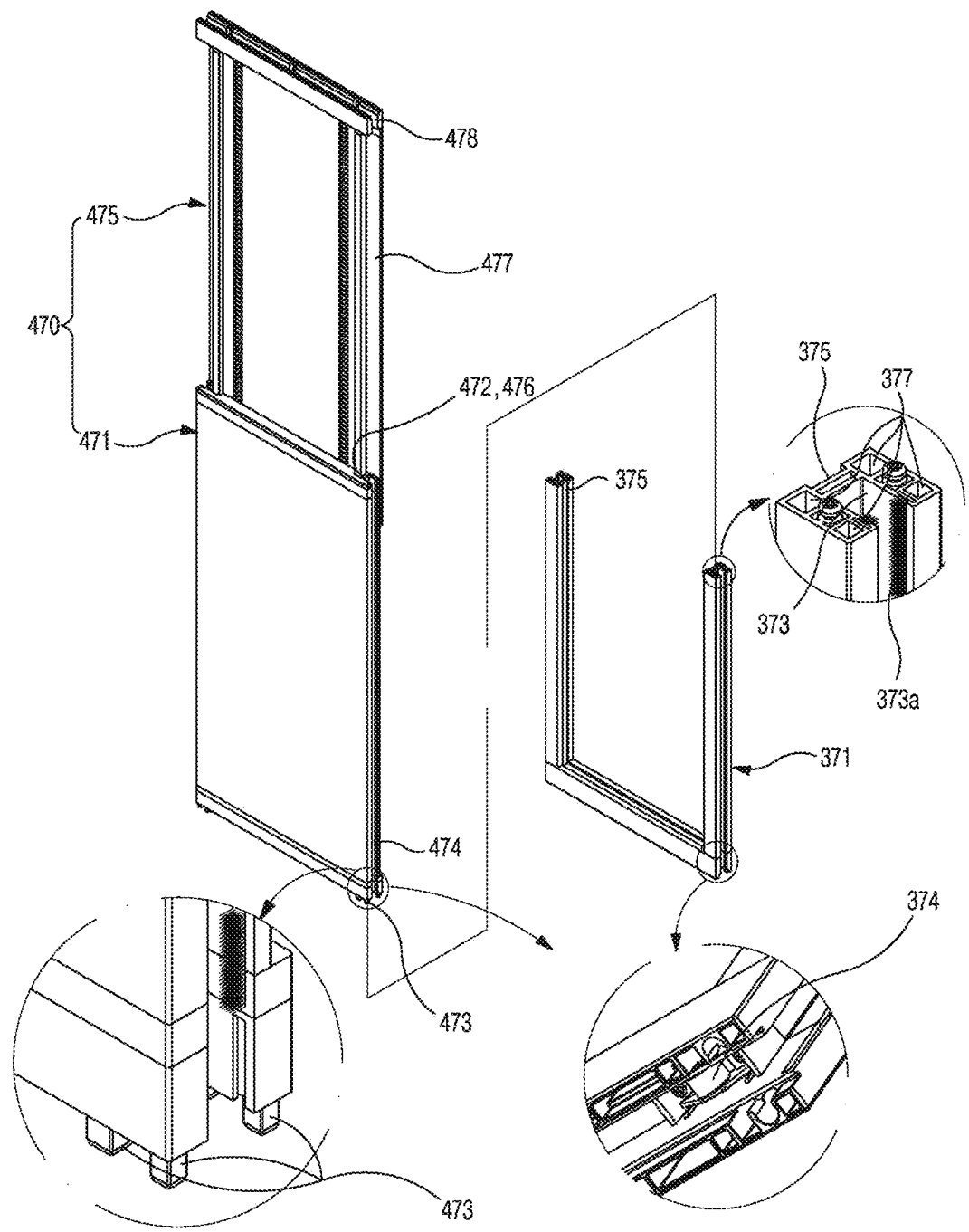
FIG. 5 is an exploded perspective view of a fixing unit of a window-mounted smart air purifier according to a preferable embodiment of the present invention.
Figure 6:
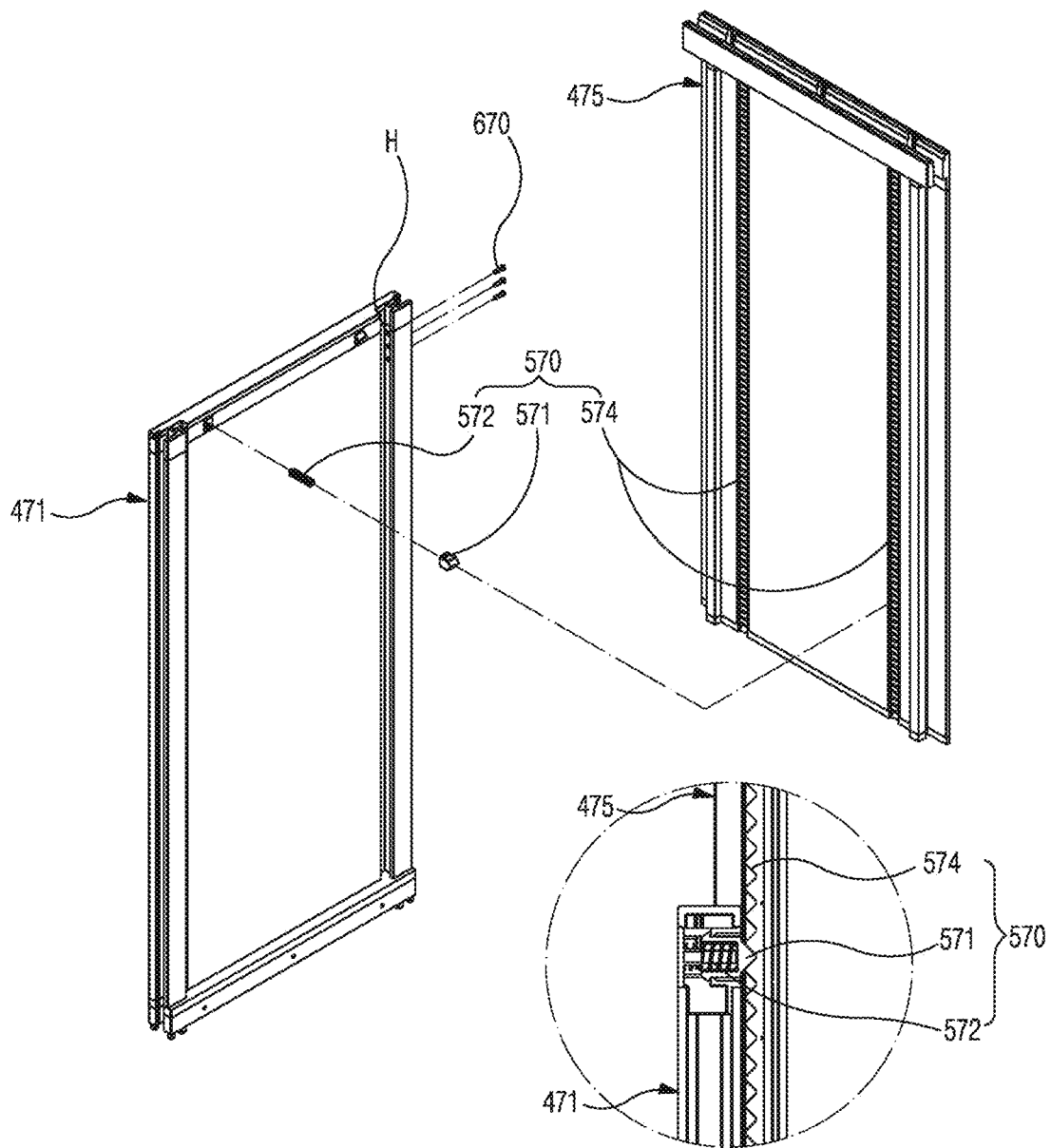
FIG. 6 is an exploded perspective view of a stopper and a binder of a fixing unit of a window-mounted smart air purifier according to a preferable embodiment of the present invention.
Figure 7:
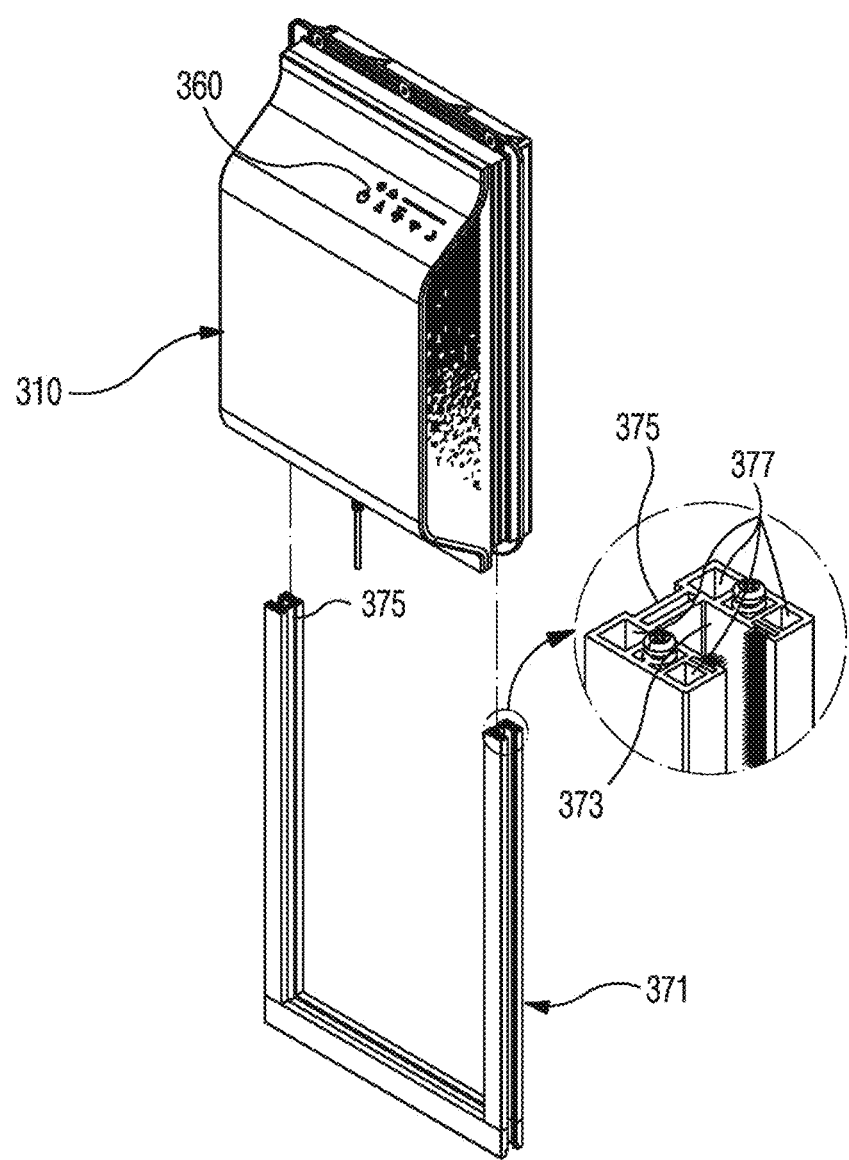
FIG. 7 is an exploded perspective view of a connection of a housing unit and a fixing unit of a window-mounted smart air purifier according to a preferable embodiment of the present invention.

FIG. 1 is a front perspective view of a window-mounted smart air purifier according to a preferable embodiment of the present invention. FIG. 2 is a back perspective view of a window-mounted smart air purifier according to a preferable embodiment of the present invention. FIG. 3 is an exploded perspective view of an operational motion of a spring damper of a window-mounted smart air purifier according to a preferable embodiment of the present invention. FIG. 3 is an exploded perspective view of an operational motion of a spring damper of a window-mounted smart air purifier according to a preferable embodiment of the present invention. FIG. 3 is an exploded perspective view of an operational motion of a spring damper of a window-mounted smart air purifier according to a preferable embodiment of the present invention. FIG. 4 is a drawing showing an inner structure of a window-mounted smart air purifier according to a preferable embodiment of the present invention. FIG. 5 is an exploded perspective view of a fixing unit of a window-mounted smart air purifier according to a preferable embodiment of the present invention. FIG. 6 is an exploded perspective view of a stopper and a binder of a fixing unit of a window-mounted smart air purifier according to a preferable embodiment of the present invention. FIG. 7 is an exploded perspective view of a connection of a housing unit and a fixing unit of a window-mounted smart air purifier according to a preferable embodiment of the present invention.

Referring to FIGS. 1 to 7, a window-mounted smart air purifier 300 according to a preferable embodiment of the present invention comprises a housing unit 310, a first air circulation unit 320, a second air circulation unit 330, an air purification unit 340, a heat exchanger 350, a controller 360, and a fixing unit 370.

The housing unit 310 is a passage that indoor air and outdoor air move through.

In this instance, the housing unit 310 is divided into an indoor air exhaust space 311, an outdoor air introduction space 314, an outdoor air discharge space 316, a central space 318, and an indoor air introduction space 319. In this instance, these spaces are formed to enable air to move around between the spaces freely.

In addition, as both cold air and warm air move inside the housing unit 310, dew condensation can be occurred in the housing unit 310. The window-mounted smart air purifier 300 of the present invention is made of EPP (Expanded Polypropylene) materials, which has an excellent insulation characteristic, to prevent this dew condensation.

The indoor air exhaust space 311 includes an indoor air exhaust opening 313, and the indoor air introduction space 319 includes an indoor air suction opening 312. The outdoor air introduction space 314 includes an outdoor air suction opening 315, and the outdoor discharge space 316 includes a fresh air discharge opening 317.

In this instance, the central space 318 is formed so that each of the indoor air and outdoor air passes through an individual pipe intersecting with each other.

Meanwhile, the first air circulation unit 320 is installed in the indoor air exhaust space 311 and forcibly circulates air in order to emit the polluted indoor air to outside.

Thus, the first air circulation unit 320 comprises a first air circulation fan 321, which forcibly circulates the air when external power is on. In this instance, the first air circulation fan 321 forcibly circulates air so that polluted indoor air introduced through the indoor air suction opening 312 moves toward the indoor air exhaust opening 313.

Meanwhile, the second air circulation unit 330 is installed in the outdoor air discharge space 316 and forcibly circulates air in order to introduce outdoor air to the indoor.

Thus, the second air circulation unit 320 comprises a second air circulation fan 331, which forcibly circulates air when external power is on. In this instance, the second air circulation fan 331 forcibly circulates the air so that outdoor air introduced through the outdoor air suction opening 315 moves toward the outdoor air discharge opening 316.

Meanwhile, the air purification unit 340 purifies the air by filtering impurities contained in the indoor air introduced through the indoor air suction opening 312 and in the outdoor air introduced through the outdoor air suction opening 315.

In this instance, the air purification unit 340 is installed at moving paths of the indoor air and the outdoor air. According to some embodiments of the present invention, the air purification unit 340 comprises a first free filter P1, which is installed between the indoor air introduction space 319 and the central space 318; a second free filter P2, which is installed between the outdoor air introduction space 314 and the central space 318; and a hepa filter and deodorization filter P3.

Meanwhile, the heat exchanger 350 is installed at the central space 318 inside the housing unit 310.

As illustrated in drawings, in the central space 318, each of the indoor air and the outdoor air passes through an individual pipe intersecting with each other. The heat exchanger 350 is installed on or haves contacts with the pipes of the indoor air and the outdoor air, and exchange heats between the indoor air and the outdoor air.

In other words, when the indoor air is warm and the outdoor air is cold, the heat of the indoor air is transferred to the outdoor air, and makes the air introduced into the indoor warm up. In contrast, when the indoor air is cold and the outdoor air is warm, the cold temperature of the indoor air is transferred to the outdoor air, and makes the air introduced into indoor cool down.

Accordingly, the heat exchanger 350 can minimize heat loss occurred during the operation of the window-mounted smart air purifier 300 according to a preferable embodiment of the present invention by adjusting the temperature of the outdoor air supplied into the indoor.

Meanwhile, the controller 360 is installed at a front side of the housing unit 310. The controller 360 controls an on/off function and operations of the first air circulation unit 320 and second air circulation unit 330.

In addition, the controller 360 may include a timer T. Accordingly, in some embodiments, the controller 360 may further include a filter replacement notification function of the heap filter and deodorization filter P3 and a timer reset function.

Furthermore, a sensor module, which sends a signal to the controller 360, comprises a VOC sensor N1, a CO2 sensor N2, and a coarse particle sensor N3.

Accordingly, the window-mounted smart air purifier 300 according to a preferable embodiment of the present invention can check air qualities of the outdoor air and the indoor air through the sensors.

Moreover, the controller 360 includes a IoT function, which exchanges data through a smart device and the internet. The IoT function enables a user to check various information including an outdoor temperature, an outdoor humidity, an overall outdoor air quality, an outdoor air quality, an overall indoor air quality, an indoor air quality, remote control, and filter replacement time, through the smart device.

A spring damper 380 is installed at the outdoor air suction opening 315. The spring damper 380 opens the suction opening 315 when air circulates, and closes the suction opening 315 when the air stops circulating.

In this instance, when the controller 360 determines that there are problems in the outdoor air, such as tobacco smoke, fire smoke, stink or offensive odor, which are detected by the VOC sensor P1, and stops an operation of the second air circulation unit 330, the spring damper 380 closes the outdoor air suction opening 315 and thereby the air circulation stops. Meanwhile, when the controller 360 determines that there is no issue, which is detected by the VOC sensor P1, in the outdoor air, and allows an operation of the second air circulation unit 330, a force generated by the air circulation forcibly opens the outdoor air suction opening 315.

Meanwhile, the fixing unit 370 is a mean to fix the housing unit 310 between a window frame and a window.

In this instance, the fixing unit 370 comprises a frame body 371 and a slide wall 470.

The frame body 371 is square-shaped, which has an opening upward. Specifically, the frame body 371 has a first connection groove 373 formed on an outer side of the frame body 371 to engage with a rail of the window frame; a roller 374 formed on a bottom side of the first connection groove 373 to make the frame body 371 roll on the rail of the window frame; a slide groove 375 formed on an internal side of the frame body 371 to conjointly engage with the edges of the housing unit 310; and an inserting hole 377 formed on a top end of the frame body 371.

In this instance, the first connection groove 373 may further comprise a mohair 373a to keep out draft or impurities such as dust coming through a gap of the window frame.

In addition, the slide wall 470 is fixed to a top end of the housing unit 310. Thus, the slide wall 470 covers from the top end of the housing unit 310 to the top portion of the window frame 30.

Specifically, according to the detailed structure of the slide wall 470, the slide wall 470 comprises a lower plate 471, an upper plate 475, a stopper 570, and a binder 670.

The lower plate 471 is engaged with the top end of the housing unit 310. The lower plate 471 has a guide groove 472 formed in an inner side; an insertion bump 473 protruded from and formed in a bottom end; a second connection groove 474 formed in both lateral sides, which are engaged with the rail of the window frame 30; and a fixing hole H formed in a top portion.

In this instance, the insertion bump 473 is inserted into and connected to the inserting hole 377, thereby the frame body 371 and the lower plate 471 having strong connection.

Furthermore, the upper plate 475 is sliding-movably connected to the lower plate 471. The upper plate 475 includes a guide bump 476 formed in an outer side of the upper plate 475 and sliding-movably connected to the guide groove 472; a contact member 477 formed in both lateral sides of the upper plate 475 along the lower plate 471 and meeting with the edges of the lower plate 471 for stable sliding motion; and a third connection groove 478 formed in both lateral sides of a top portion of the upper plate 475 and connected to the rail of the window frame.

Accordingly, when the guide bump 476 slidingly moves along the guide groove 472, the contact member 477 is more closely adhered to the lower plate 471, which enables more stable sliding motion of the upper plate 475.

The stopper 570 is disposed between the lower plate 471 and the upper 475 plate. The stopper 570 limits a sliding motion of the upper plate 475 when an adjustable length of the lower plate 471 and the upper plate 475 by the sliding motion of the upper plate 475, reaches to a desired length.

In this instance, the stopper 570 comprises a wedge type stopper 571 and a stopper rail 574.

The wedge type stopper 571 is formed at a back side of the lower plate 471 and can be protruded toward the upper plate 475 by an elastic force of an elastic spring 572.

In addition, the stopper rail 574 is formed at a front side of the upper plate 475 in order to be stuck in and connected to the wedge type stopper 571. The stopper rail 574 has a shape where wedge type grooves and bumps are alternatively formed.

Accordingly, the wedge type stopper 571 is inserted to a wedge-shaped groove of the stopper rail 574 and can limit the adjustment of the length of the lower plate 471 and the upper plate 475. When a user pulls the upper plate 475 upward, the wedge type stopper 571 moves along the stopper rail 574 by the external force.

Then, when the external force that is applied to the upper plate 475 is removed, the wedge type stopper 571 inserted in the wedge-shaped groove of the stopper rail 574 can limit the length adjustment of the lower plate 471 and the upper plate 475.

Meanwhile, the lower plate 471 and the upper plate 475 are fixed by the binder 670. Specifically, the binder 670 is engaged with the fixing hole H, and an end of the binder 670 pressurizes the guide bump 476, which enables the lower plate 471 and the upper plate 475 to be fixed.

Figure 8:
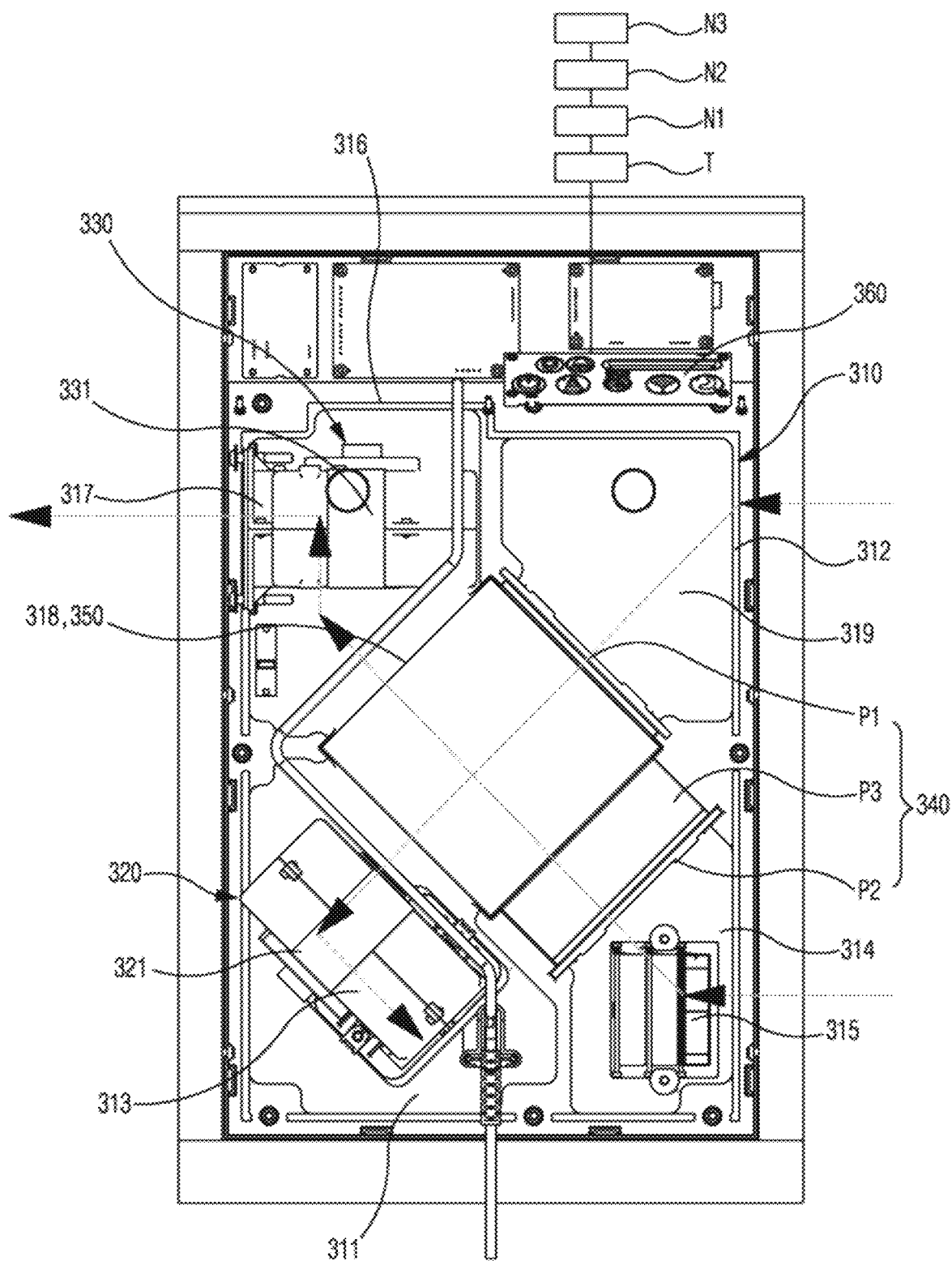
FIG. 8 is a drawing showing an operational motion of an inner structure of a window-mounted smart air purifier according to a preferable embodiment of the present invention.

FIG. 8 is a drawing showing an operational motion of an inner structure of a window-mounted smart air purifier according to a preferable embodiment of the present invention.

Referring to FIG. 8, a window-mounted smart air purifier 300 according to a preferable embodiment of the present invention starts to be operated by turning on the controller 360.

In this instance, when the window-mounted smart air purifier 300 according to a preferable embodiment of the present invention starts to be operated, the first air circulation fan 321 of the first air circulation unit 320 is operated and emits the polluted indoor air to the outside.

Thus, when the first air circulation fan 321 is operated, the polluted indoor air introduced through the indoor air suction opening 312 is emitted through the indoor air suction opening 312, the indoor air introduction space 319, the central space 318, the indoor air exhaust space 311, and the indoor air exhaust opening 313 to the outside.

In this instance, the polluted indoor air moving to the central space 318 through the indoor air introduction space 319 is filtered dust and impurities in the air while passing through the first free filter P1 of the air purification unit 340.

In addition, the second air circulation fan 331 of the second air circulation unit 330 is operated, fresh outdoor air is introduced to the indoor.

Thus, when the second air circulation fan 331 is operated, the outdoor air introduced through the outdoor air suction opening 315 is introduced to the indoor through the outdoor air suction opening 315, the outdoor air introduction space 314, the central space 318, the indoor air discharge space 316, and the outdoor air discharge opening 317 to the inside.

In this instance, the outdoor air moving to the central space 318 through the outdoor air introduction space 314 is filtered dust and impurities in the air while passing through the second free filter P2 and the hepa filter and deodorization filter P3 of the air purification unit 340, which allows fresh air to be supplied into the indoor.

In this instance, in the central space 318, each of the indoor air and outdoor air passes through an individual pipe intersecting with each other. The heat exchanger 350 installed at the central space 317 exchanges heats between the indoor air and the outdoor air, which can minimize heat loss caused by supplying the fresh outdoor air into the indoor.

Meanwhile, a replacement time of the hepa filter and deodorization filter P3 can be notified to a user by the timer T equipped in the controller 360. When a user replaces the filter P1, P2, P3, the user can reset the timer T to receive a notification of the replacement time of a new filter P3.

In addition, the VOC sensor N1, the CO2 sensor N2, and the coarse particle sensor N3 equipped in the controller 360 measure the air qualities of the outdoor air and the indoor air.

Accordingly, the controller 360 controls operation of the window-mounted smart air purifier 300 by stopping the operation of the window-mounted smart air purifier 300 when the air quality of the indoor air is in a clean level or air quality of the outdoor air is in a bad level, which are measured by the sensors N1, N2, N3; and by driving the operation of the window-mounted smart air purifier 300 when the air quality of the indoor air is in a bad level or air quality of the outdoor air is in a good level, which are measured by the sensors N1, N2, N3.

In some embodiments, the CO2 sensor N2 and the coarse particle sensor N3 may be equipped in the indoor.

In this instance, the CO2 sensor N2 and the coarse particle sensor N3 may automatically adjust the amount of ventilation by controlling the speed of the fan according to concentrations of the CO2 and the coarse particles measured indoor.

For example, the CO2 sensor N2 and the coarse particle sensor N3 may be set in such a way that when pollution is severely high, the fan 321, 331 speeds up, which leads to an increase of ventilation; in contrast, when pollution is low, the fan 321, 331 speed slows down, which leads to a decrease of ventilation. In addition, the CO2 sensor N2 and the coarse particle sensor N3 may be set in such a way that when pollution is very low, the fan 321, 331 stops; and when pollution gets high, the fan 321, 331 becomes reoperated. These functions can reduce costs of electricity, air conditioning, and heating.

In addition, the VOC sensor N1 may be equipped in the outdoor to detect outdoor odors.

In this instance, when the VOC sensor N1 detects outdoor odors, the controller 360 blocks the outdoor odors by control of the second air circulation fan 331.

Meanwhile, the spring damper 380 in the preferable embodiment of the present invention closes down the outdoor air suction opening 315 by its own elastic force when the controller 360 determines that there are problems in the outdoor air, such as tobacco smoke, fire smoke, stink or offensive odor, which are detected by the VOC sensor N1, and stops an operation of the second air circulation unit 330. On the other hand, when the controller 360 determines that there is no issue in the outdoor air, which is detected by the VOC sensor P1, and allows an operation of the second air circulation unit 330, a force generated by the air circulation forcibly opens the outdoor air suction opening 315.

The controller 360 of the window-mounted smart air purifier 300 according to a preferable embodiment of the present invention further comprises a IoT function that exchanges data through a smart device and the internet.

Figure 9A:
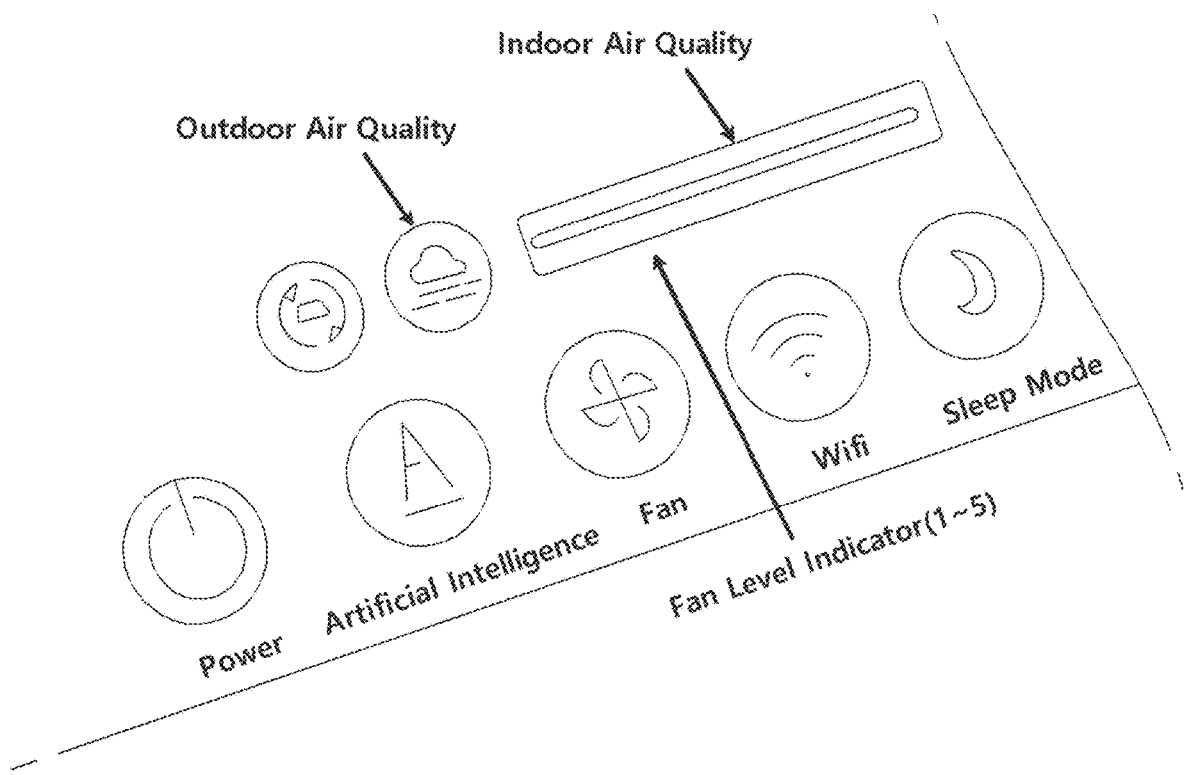
FIG. 9a is a drawing showing a setting screen of a controller of a window-mounted smart air purifier according to a preferable embodiment of the present invention.
Figure 9B:
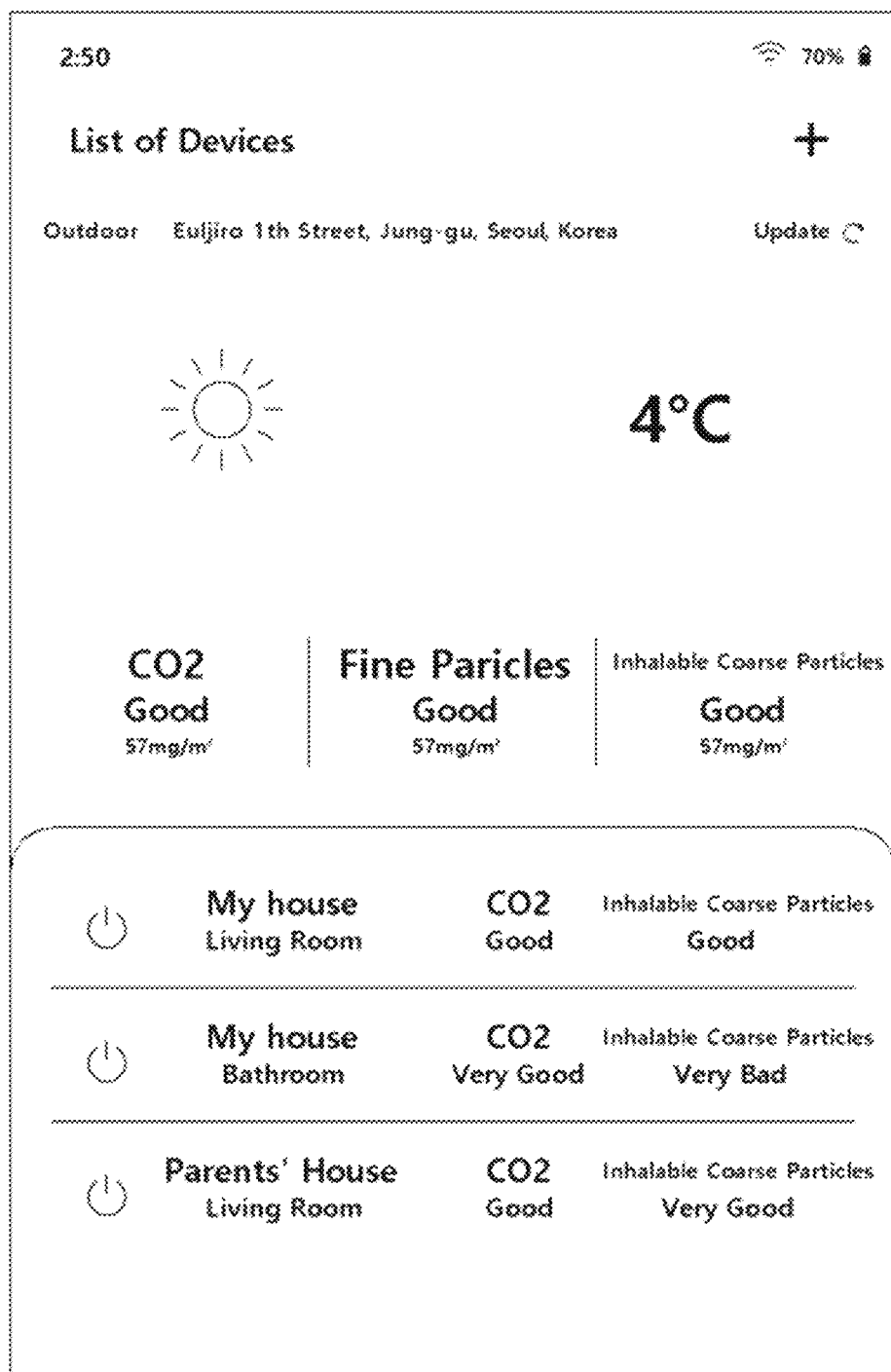
FIGS. 9b and 9c are drawings showing a setting screen displaying a IoT function that is embodied through a controller of a window-mounted smart air purifier according to a preferable embodiment of the present invention.
Figure 9C:
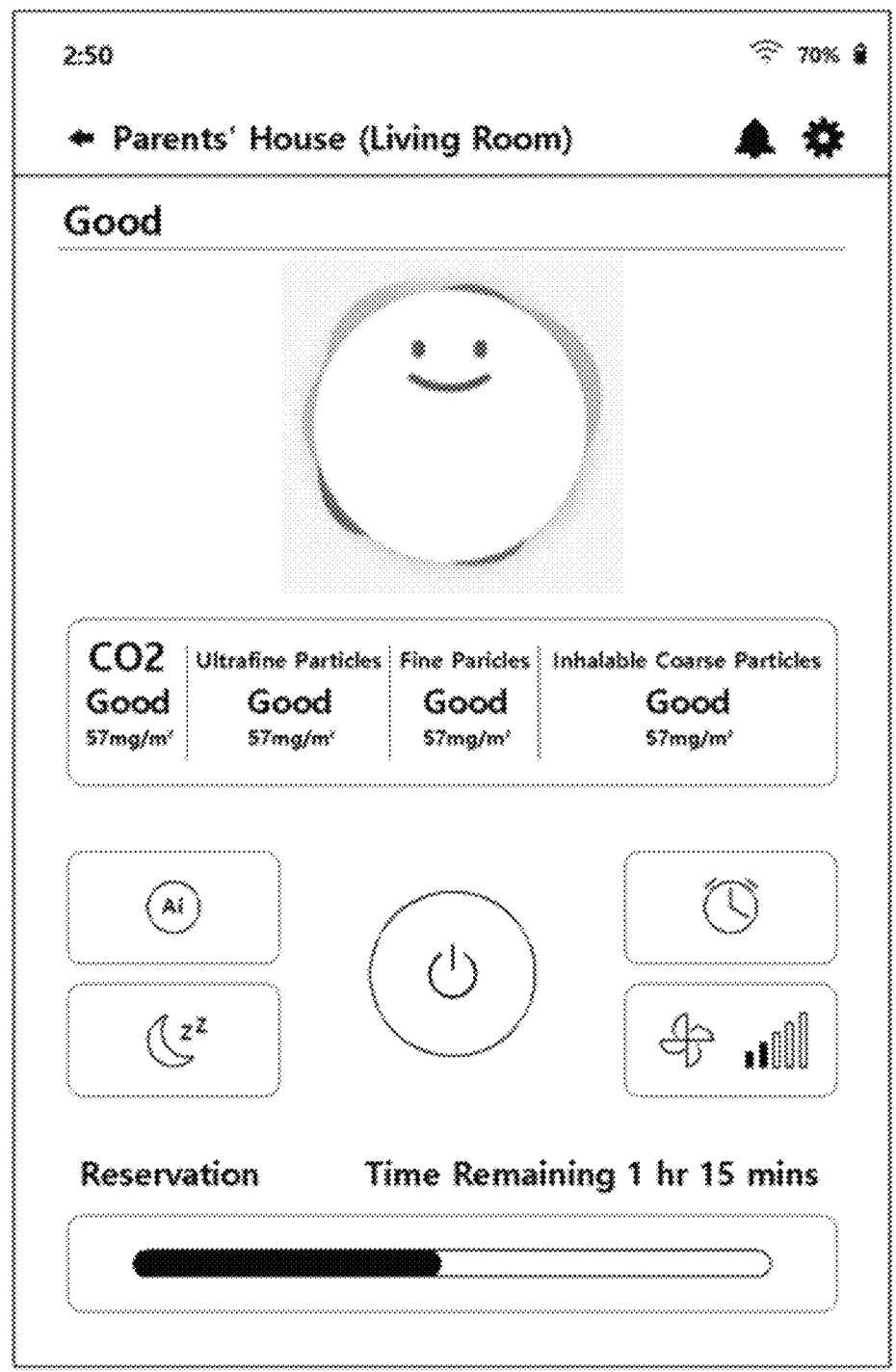

FIG. 9a is a drawing showing a setting screen of a controller of a window-mounted smart air purifier according to a preferable embodiment of the present invention. FIGS. 9b and 9c are drawings showing a setting screen displaying a IoT function that is embodied through a controller of a window-mounted smart air purifier according to a preferable embodiment of the present invention.

Referring to FIG. 9a, the controller 360 of the present invention may be displayed as an indoor air quality display screen, a sleep mode setting screen, a WiFi display screen, a fan display screen, an artificial intelligence display screen, and a power display screen.

In addition, referring to FIGS. 9b and 9c, the window-mounted smart air purifier 300 according to a preferable embodiment of the present invention may enable a user to check various information including an outdoor temperature, an outdoor humidity, an overall outdoor air quality, an outdoor air quality, an overall indoor air quality, an indoor air quality, remote control, and filter replacement time, through the smart device, and control operation of the smart air purifier 300.

The operation principle of the IoT function is a widely well-known technology, and the detailed explanation of it is omitted.

Meanwhile, an installment of the fixing unit 370 for installing the present invention at the window frame 30 will be described referring to drawings.

Figure 10A:
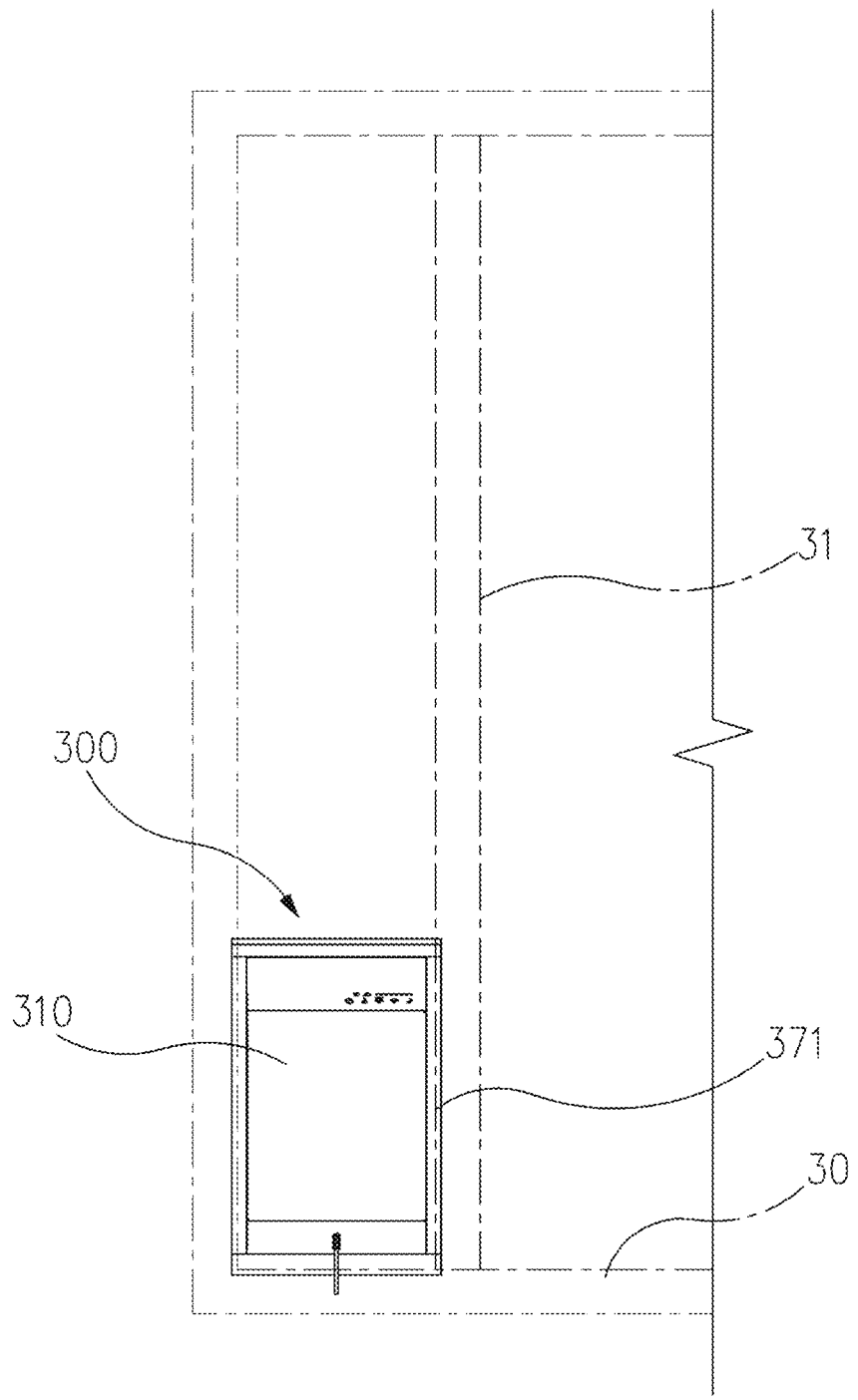
FIGS. 10a and 10b are drawings showing an installment of a window-mounted smart air purifier at a window frame according to a preferable embodiment of the present invention.
Figure 10B:
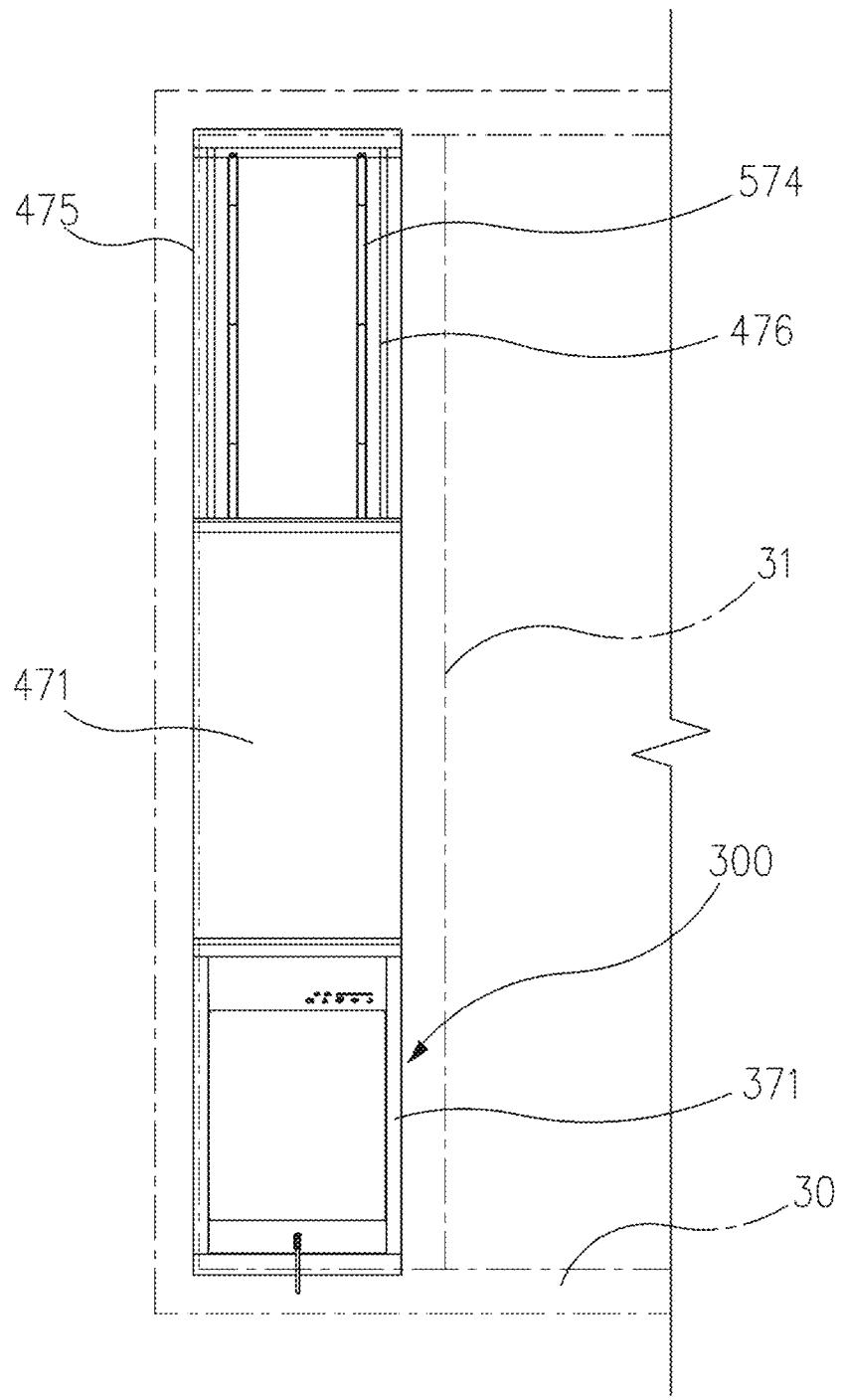
Figure 11:
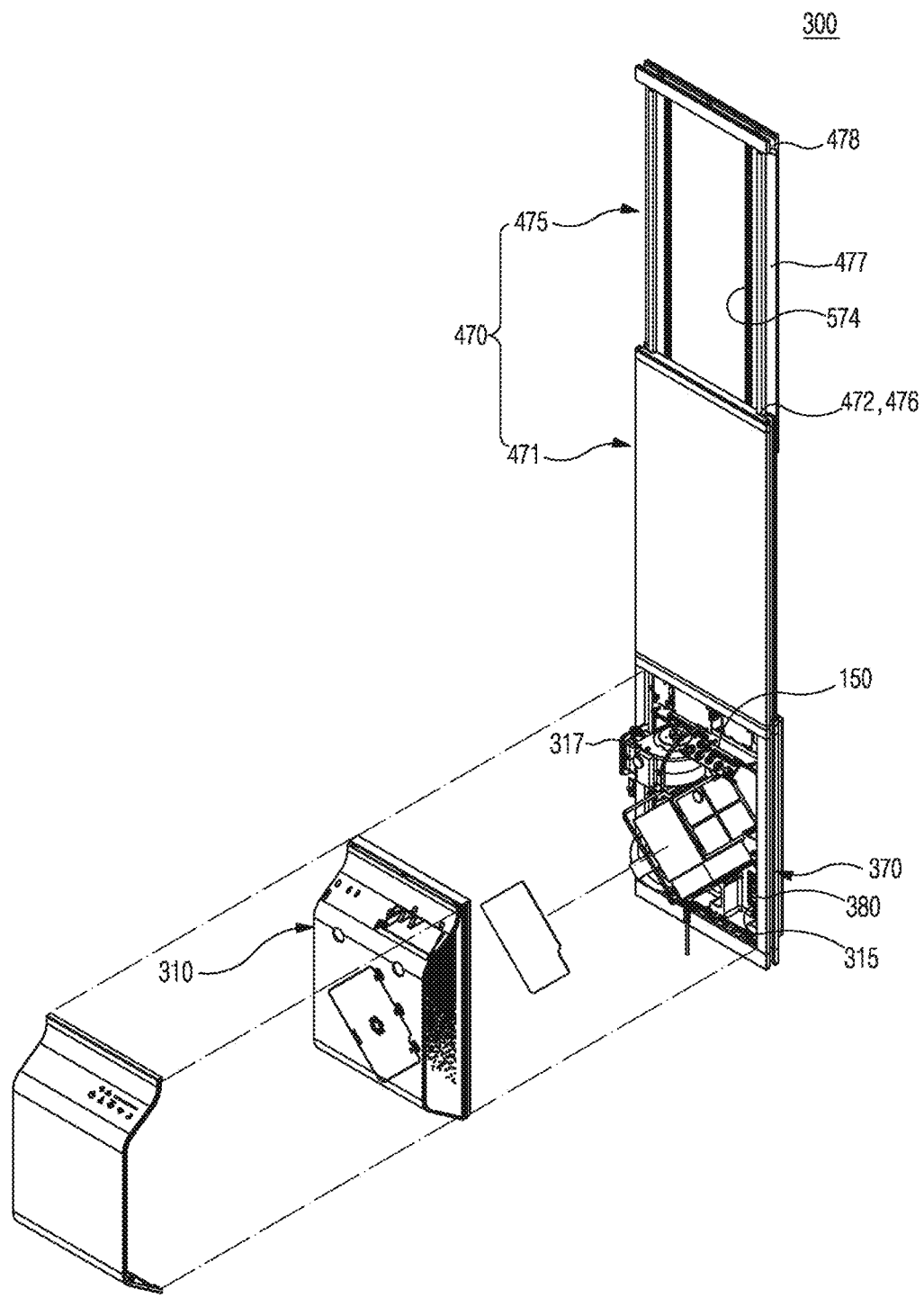
FIG. 11 is a front exploded perspective view of a window-mounted smart air purifier according to a preferable embodiment of the present invention.
Figure 12:
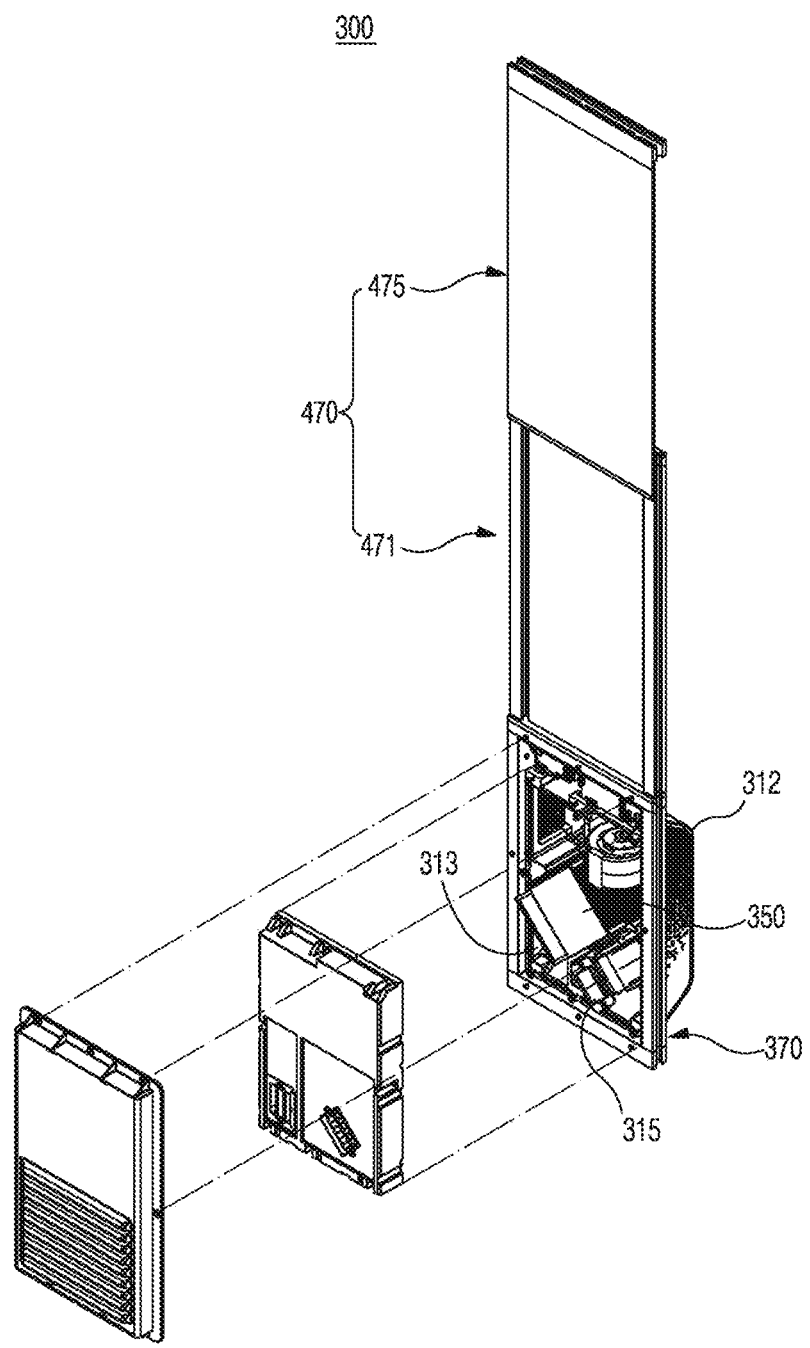
FIG. 12 is a back exploded perspective view of a window-mounted smart air purifier according to a preferable embodiment of the present invention.
Figure 13A:
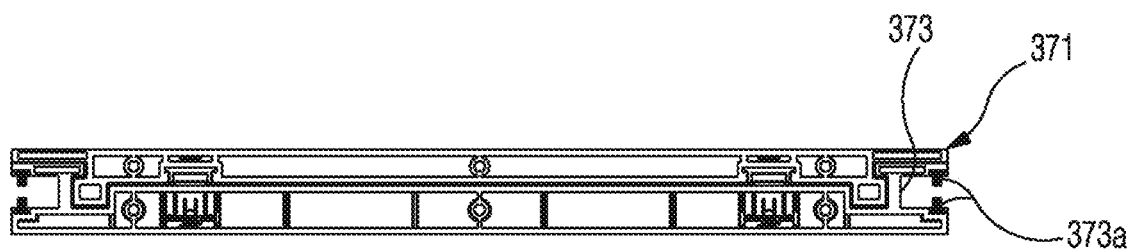
FIGS. 13a and 13b are a schematical cross-sectional view of a slid wall of a window-mounted smart air purifier according to a preferable embodiment of the present invention.
Figure 13B:
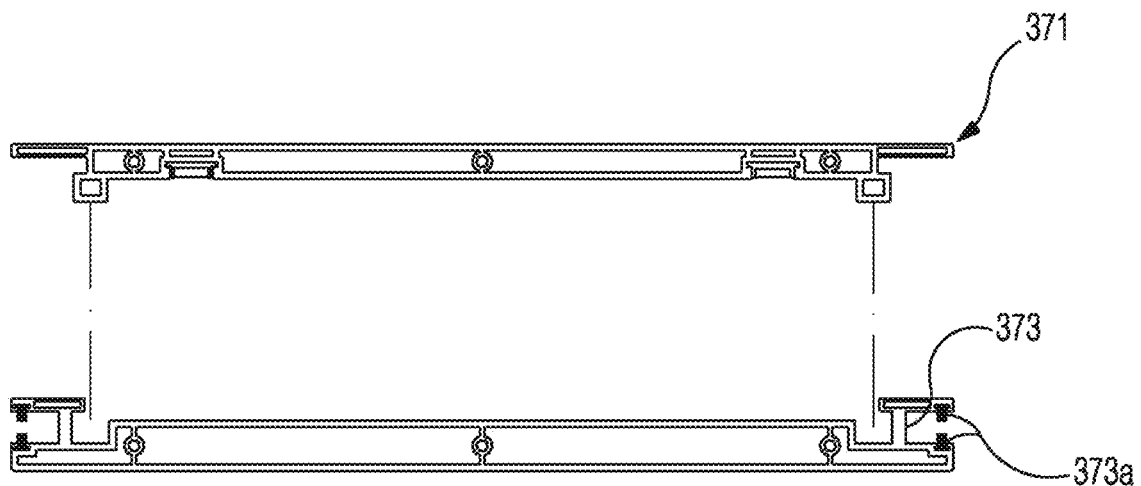

FIGS. 10a and 10b are drawings showing an installment of a window-mounted smart air purifier at a window frame according to a preferable embodiment of the present invention. FIG. 11 is a front exploded perspective view of a window-mounted smart air purifier according to a preferable embodiment of the present invention. FIG. 12 is a back exploded perspective view of a window-mounted smart air purifier according to a preferable embodiment of the present invention. FIGS. 13a and 13b are a schematical cross-sectional view of a slid wall of a window-mounted smart air purifier according to a preferable embodiment of the present invention.

Referring to FIGS. 10a to 13b, to install the window-mounted smart air purifier 300 according to a preferable embodiment of the present invention at the window frame 30, first of all, the frame body 371 of the fixing unit 370 is installed in a gap between the window frame 30 and the window 31.

In this instance, the frame body 371 is connected to a rail (not shown) of the window frame 30 through the first connection groove 373 formed in edges of the frame body 371. The roller 374 formed in a bottom side of the frame body 371 is sit on the rail of the window frame 30, and enables the frame body 371 to be moved from side to side by rolling.

The housing unit 310 is inserted into and combined to the slide groove 375 of the frame body 371.

The top end of the housing unit 310 is connected to the bottom end of the lower plate 471, which is a part of the slide wall 470.

The guide groove 472 of the lower plate 471 is connected to the guide bump 476 of the upper plate 475.

An entire length of the slide wall 470 is adjusted to a desired length by sliding-movement of the upper plate 475.

When the length of the slide wall 470 reaches to the desired length, the stopper 570 limits further length adjustment of the upper plate 475 and the lower plate 471.

Thus, the wedge type stopper 571 of the slide wall 470 is inserted into the wedge-shaped groove of the stopper rail 574, thereby limiting the length adjustment of the upper plate 475 and the lower plate 471. When a user pulls the upper plate 475 upward, the wedge type stopper 571 moves along the stopper rail 574 by the external force.

Then, when the external force that is applied to the upper plate 475 is removed, the wedge type stopper 571 inserted into the wedge-shaped groove of the stopper rail 574 can limit the length adjustment of the lower plate 471 and the upper plate 475.

In this state, the lower plate 471 and the upper plate 475 are fixed by the binder 670. Specifically, when the slide wall 470 reaches to the desired length by the stopper 570, the binder 670 is engaged with the fixing hole H, and an end of the binder 670 pressurizes the guide bump 476, which enables the lower plate 471 and the upper plate 475 to be fixed.

Meanwhile, the embodiment of the present invention mentioned above is explained according to a sequential installation process of the frame body 371, the lower plate 471, and the upper plate 475, but the present invention is not limited to those installation method. The pre-assembled set of the frame body 371, the lower plate 471, and the upper plate 475 may be mounted on the window frame 30, depending on installation places.

Accordingly, the window-mounted smart air purifier according to a preferable embodiment of the present invention comprising an additional heat exchanger inside can prevent potential heat loss that may be caused by a ventilation process and reduce costs of heating and air conditioning.

In addition, the window-mounted smart air purifier according to a preferable embodiment of the present invention is installed at the window frame and does not need perforation in the ceiling or the wall during the installation process, which can enhance convenience of installation.

Figure 14:
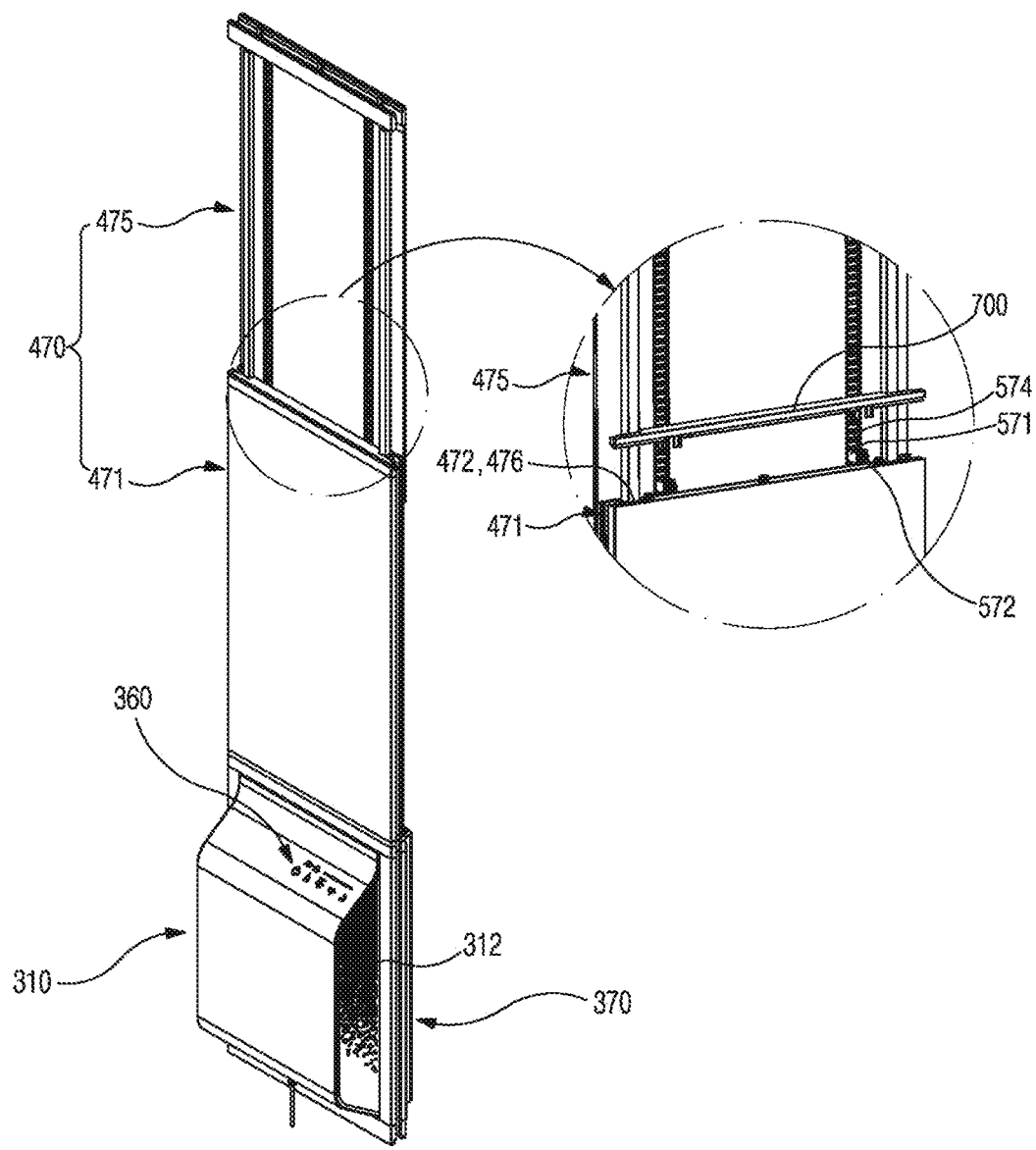
FIG. 14 is a drawing of another embodiment of a slid wall of a window-mounted smart air purifier according to a preferable embodiment of the present invention.

FIG. 14 is a drawing of another embodiment of a slid wall of a window-mounted smart air purifier according to a preferable embodiment of the present invention.

Referring to FIG. 14, the window-mounted smart air purifier may further comprise a locking device 700. The locking device 700 is formed above the top end of the lower plate 471 and vertically moves along the guide bump 476.

The locking device 700 prevents the wedge type stopper 571 from moving backward by supporting the wedge type stopper 571.

Accordingly, the wedge type stopper 571 is fixed to the wedge-shaped groove of the stopper rail 574, which enables the lower plate 471 to have a stable fixed structure.

Figure 15:
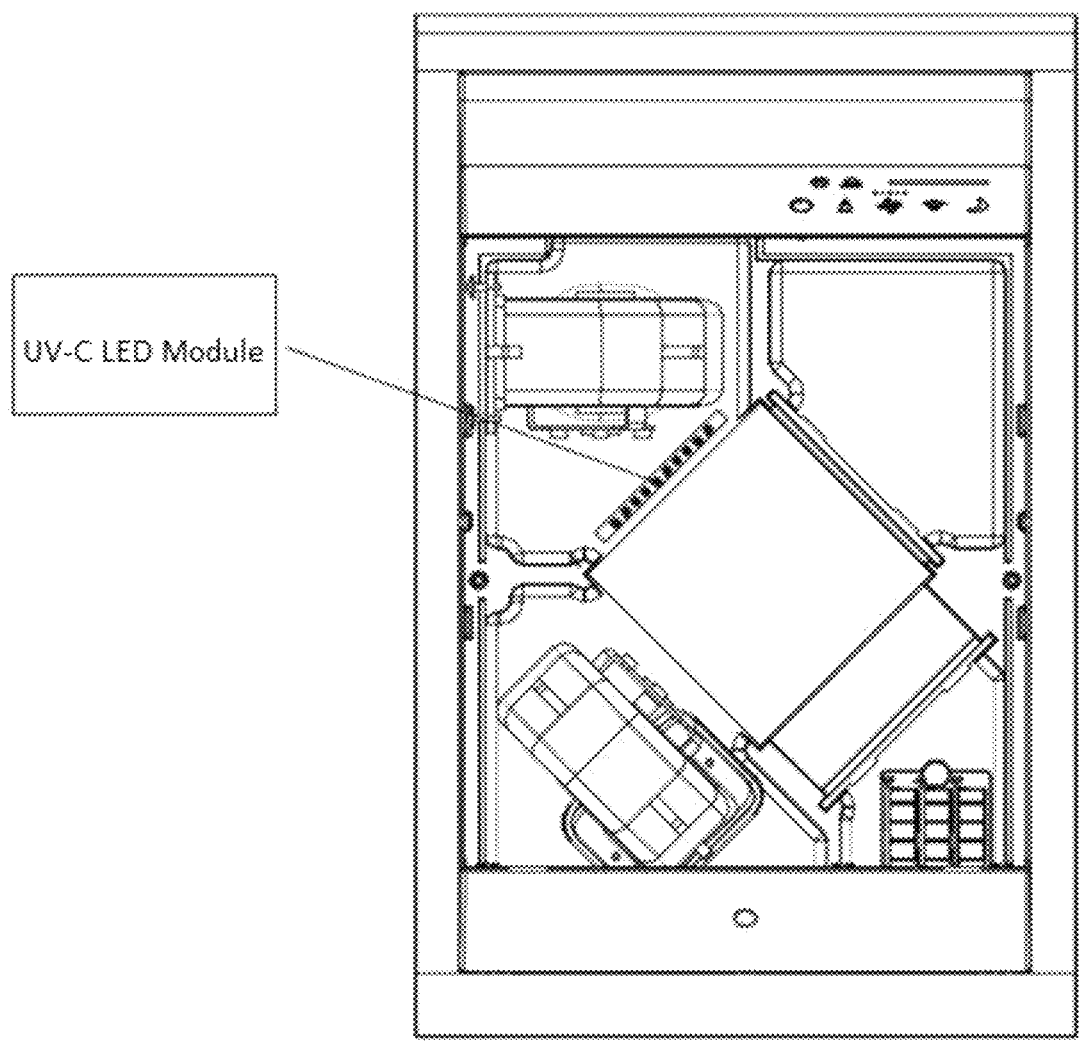
FIG. 15 is a drawing prefiguratively showing a window-mounted smart air purifier with UV-C LED (Ultraviolet-C Light Emitting Diode) according to a preferable embodiment of the present invention.

Meanwhile, FIG. 15 is a drawing prefiguratively showing a window-mounted smart air purifier with UV-C LED (Ultraviolet-C Light Emitting Diode) according to a preferable embodiment of the present invention.

The UV-C LED according to embodiments of the present invention may be installed in the central space 318 of the window-mounted smart air purifier, such as an area near the heat exchanger 350.

The UV-C is a kind of ultraviolet light having a short-wavelength range from about 100 nm to about 280 nm. By installing the UV-C LED inside the air purifier, bacteria contained in the air can be sterilized inside the air purifier.

Figure 16:
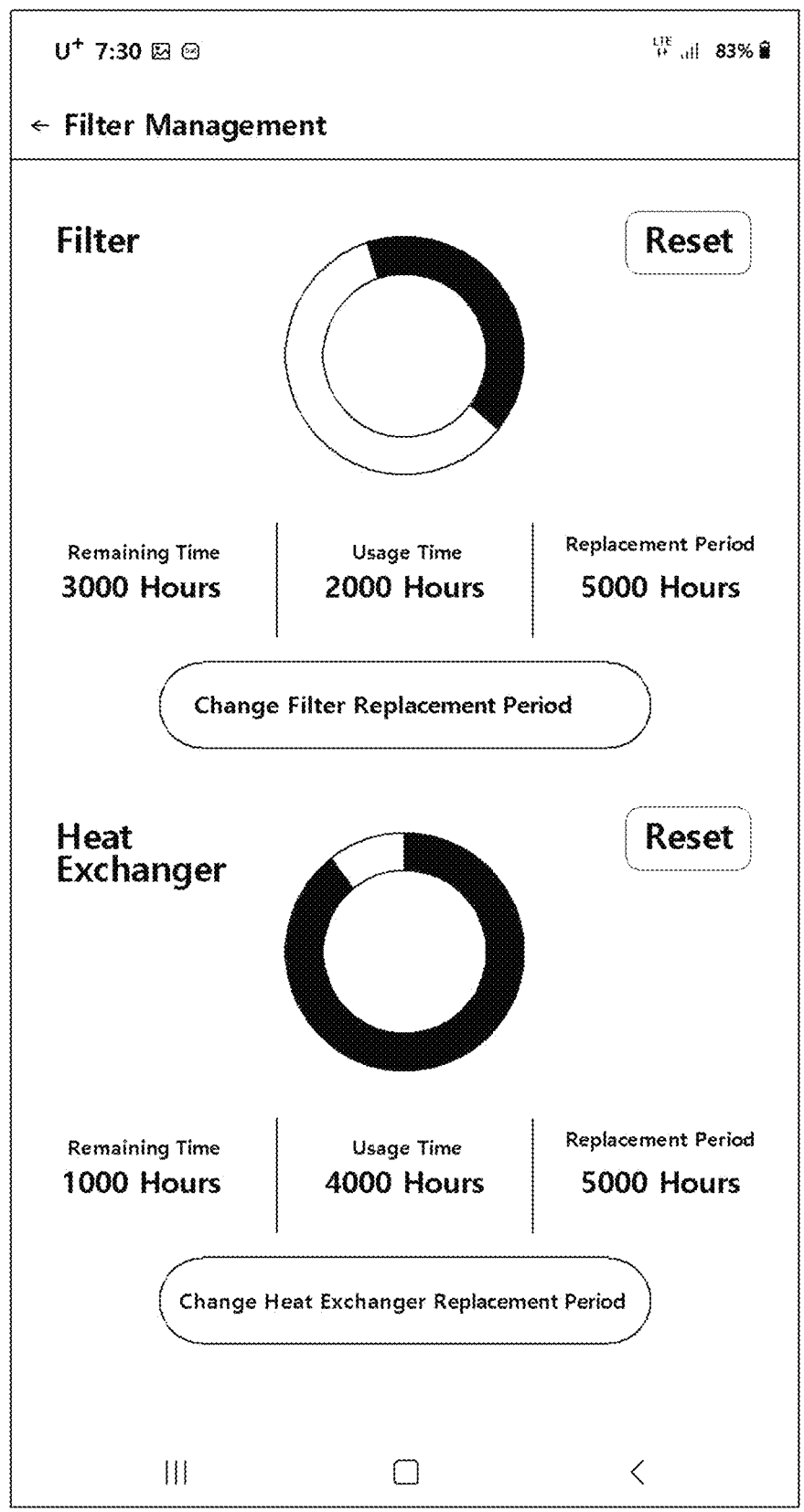
FIG. 16 is a drawing prefiguratively showing a UI (User Interface) screen for managing consumables such as a filter, a heat exchanger, and others, of a window-mounted smart air purifier according to a preferable embodiment of the present invention.

Meanwhile, FIG. 16 is a drawing prefiguratively showing a UI (User Interface) screen for managing consumables such as a filter, a heat exchanger, and others, of a window-mounted smart air purifier according to a preferable embodiment of the present invention.

Information regarding each consumable may be shown as figures of total usage time, remaining time, replacement period, and others. In addition, those figures may be shown as graphs so that a user can intuitively know total usage time, remaining time, and others.

Figure 17:
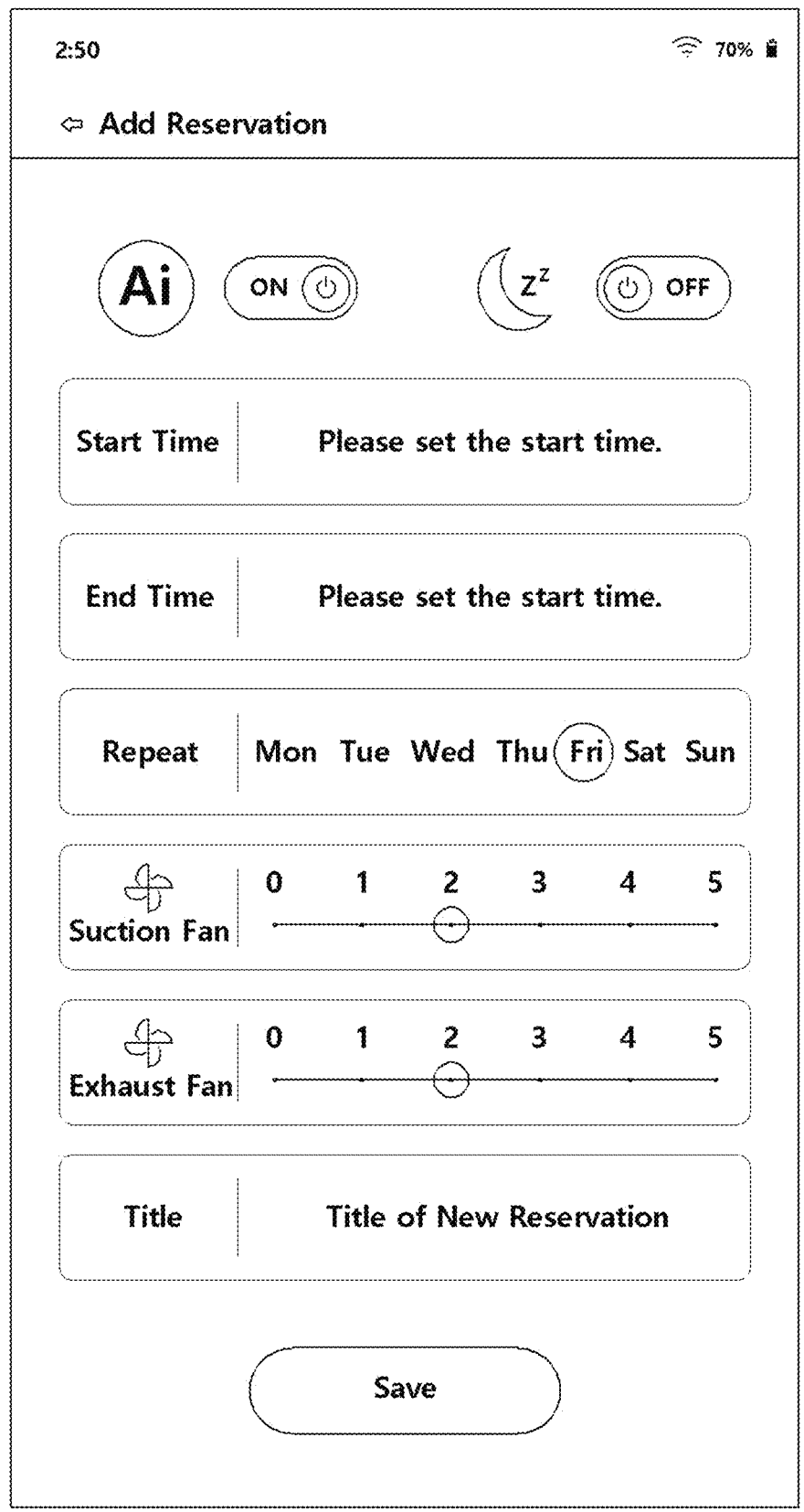
FIG. 17 is a drawing prefiguratively showing a UI (User Interface) screen for adding reservation of a window-mounted smart air purifier according to a preferable embodiment of the present invention.

FIG. 17 is a drawing prefiguratively showing a UI (User Interface) screen for adding reservation of a window-mounted smart air purifier according to a preferable embodiment of the present invention.

In reservation addition screen, a start time, an end time, and repetition for each day of the week can be set, and a fan intensity level of each fan can be adjusted.

What is claimed is:

1. A window-mounted smart air purifier comprising:
a housing unit that is divided into an indoor air exhaust space, an outdoor air introduction space, an outdoor air discharge space, a central space, and an indoor air introduction space in such a way that air moves around between the spaces, wherein the indoor air exhaust space includes an indoor air exhaust opening, the indoor air introduction space includes an indoor air suction opening, the outdoor air introduction space includes an outdoor air suction opening, and the outdoor air discharge space includes a fresh air discharge opening;

a first air circulation unit that is installed in the indoor air exhaust space and comprises a first air circulation fan that forcibly circulates air so that polluted indoor air introduced through the indoor air suction opening moves toward the indoor air exhaust opening;

a second air circulation unit that is installed in the outdoor air discharge space and comprises a second air circulation fan that forcibly circulates air so that outdoor air introduced through the outdoor air suction opening moves toward the outdoor air discharge space;

an air purification unit that purifies air by filtering impurities contained in the indoor air introduced through the indoor air suction opening and in outdoor air introduced through the outdoor air suction opening, and that comprises a first free filter installed between the indoor air introduction space and the central space, a second free filter installed between the outdoor air introduction space and the central space, and a hepa filter and deodorization filter;

a heat exchanger that is installed at the central space where each of the indoor air and the outdoor air passes through an individual pipe, intersecting with each other, and that is disposed in such a way that the pipes of the indoor air and the outdoor air exchanges heats each other;

a controller that controls operations of the first air circulation unit and the second air circulation unit, and a fixing unit that fixes the housing unit to a window frame, wherein the controller further comprises a timer to check a replacement period of the hepa filter and deodorization filter, and a reset function to reset the timer when replacing the filter;

wherein the controller further comprises a sensor module that measures qualities of outdoor air and indoor air, wherein the sensor module comprises a VOC sensor, a CO2 sensor, and a coarse particle sensor;

wherein the controller further comprises a IoT function that exchanges data through a smart device and internet, and that enables a user to check information including an outdoor temperature, an outdoor humidity, an overall outdoor air quality, an outdoor air quality, an overall indoor air quality, an indoor air quality, remote control, and filter replacement time, through the smart device, wherein the fixing unit comprises:

a frame body that has a square shape with an opening upward, and that includes:
  a first connection groove formed on an outer side of the frame body to connect the frame body to a rail of the window frame;
  a roller formed on a bottom side of the first connection groove;
  a slide groove formed on an inner side of the frame body to conjointly engage with edges of the housing unit;
  an inserting hole formed on a top end of the frame body; and
  a mohair formed in the first connection groove, and a slide wall that is fixed to a top end of the housing unit, and covers from the top end of the housing unit to a top portion of the window frame, wherein the slide wall comprises:

a lower plate that is engaged with the top end of the housing unit, and that includes:
  a guide groove formed in an inner side of the lower plate;
  an insertion bump protruded from and formed in a bottom end of the lower plate to be inserted and connected to the inserting hole of the frame body;
  a second connection groove formed in both lateral sides of the lower plate, to connect lower plate to the rail of the window frame; and
  a fixing hole formed in a top portion of lower plate, an upper plate that is sliding-movably connected to the lower plate, and that includes:
  a guide bump formed in an outer side of the upper plate and sliding-movably connected to the guide groove;
  a contact member formed in both lateral sides of the upper plate along the lower plate and meeting with edges of the lower plate for stable sliding motion; and
  a third connection groove formed in both lateral sides of a top end of the upper plate and connected to the rail of the window frame, a stopper that is disposed between the lower plate and the upper plate and that limits a sliding motion of the upper plate when an adjustable length of the lower plate and the upper plate by the sliding motion of the upper plate, reaches to a desired length, and a binder that is engaged with the fixing hole, wherein an end of the binder pressurizes the guide bump, whereby enabling the lower plate and the upper plate to be fixed.

2. The window-mounted smart air purifier according to claim 1, the window-mounted smart air purifier further comprises a spring damper that is installed in the outdoor air suction opening, wherein the spring damper opens the outdoor air suction opening when air circulates, and closes down the outdoor air suction opening when air stop circulating, wherein when the controller determines that there are problems in the outdoor air that are detected by the VOC sensor, and stops an operation of the second air circulation unit, the spring damper closes down the outdoor air suction opening by its own elastic force, and when the controller determines that there is no issue in the outdoor air that is detected by the VOC sensor, and allows an operation of the second air circulation unit, a force generated by the air circulation forcibly opens the outdoor air suction opening.

3. The window-mounted smart air purifier according to claim 1, wherein the stopper comprises:

a wedge type stopper that is formed at a back side of the lower plate and that is protruded toward the upper plate by an elastic force of an elastic spring, and a stopper rail that is formed at a front side of the upper plate to be stuck in and connected to the wedge type stopper, and that has a shape where wedge type grooves and bumps are alternatively formed.

* * * * *